(12) United States Patent
Jurek

(10) Patent No.: US 12,427,828 B2
(45) Date of Patent: Sep. 30, 2025

(54) MOBILE AIR CONDITIONER

(71) Applicant: Dometic Sweden AB, Solna (SE)

(72) Inventor: Todd Jason Jurek, Elkhart, IN (US)

(73) Assignee: Dometic Sweden AB, Solna (SE)

( * ) Notice: Subject to any disclaimer, the term of this patent is extended or adjusted under 35 U.S.C. 154(b) by 0 days.

(21) Appl. No.: 18/613,956

(22) Filed: Mar. 22, 2024

(65) Prior Publication Data
US 2024/0227493 A1    Jul. 11, 2024

Related U.S. Application Data

(63) Continuation of application No. 17/477,343, filed on Sep. 16, 2021, now Pat. No. 11,951,798, which is a continuation-in-part of application No. 17/440,104, filed as application No. PCT/IB2020/052438 on Mar. 17, 2020, now Pat. No. 11,987,093.

(60) Provisional application No. 63/175,304, filed on Apr. 15, 2021, provisional application No. 62/819,711, filed on Mar. 18, 2019.

(51) Int. Cl.
*B60H 1/00* (2006.01)
*B60H 1/32* (2006.01)

(52) U.S. Cl.
CPC ..... *B60H 1/00364* (2013.01); *B60H 1/00521* (2013.01); *B60H 1/00528* (2013.01); *B60H 1/00535* (2013.01); *B60H 1/3229* (2013.01); *B60H 2001/00242* (2013.01)

(58) Field of Classification Search
CPC ............ B60H 1/00364; B60H 1/00521; B60H 1/00528; B60H 1/00535; B60H 1/3229; B60H 1/00371; B60H 2001/00221; F24F 1/0314; F24F 13/32; F24F 1/0057; F25D 23/006
See application file for complete search history.

(56) References Cited

U.S. PATENT DOCUMENTS

| | | |
|---|---|---|
| 2,178,811 A | 11/1939 | Sateren |
| 2,233,102 A | 2/1941 | Kucher |
| 2,723,538 A | 11/1955 | Heidorn et al. |

(Continued)

FOREIGN PATENT DOCUMENTS

| | | |
|---|---|---|
| AU | 2004202967 A1 | 6/2005 |
| AU | 2007200788 A1 | 9/2007 |

(Continued)

OTHER PUBLICATIONS

CN-106895502-A Translation (Year: 2017).*

(Continued)

*Primary Examiner* — David J Teitelbaum
(74) *Attorney, Agent, or Firm* — Dinsmore & Shohl LLP

(57) ABSTRACT

The present embodiments relate to an HVAC system which is externally mounted on a vertical surface of an RV, truck or bus. The desire is to eliminate, or at least substantially reduce, a potential leakage path wherein water may sit on an upper surface of a vehicle and due to seal degradation over long periods of time, may find a pathway in through the roof of the vehicle and to an interior thereof. By positioning the HVAC on a vertical surface, gravity works to move water downward and away from the HVAC system rather than allowing it to stagnate in an area around potential apertures through the outer skin or outer surface of the vehicle.

18 Claims, 18 Drawing Sheets

(56) References Cited

U.S. PATENT DOCUMENTS

| | | | |
|---|---|---|---|
| 2,870,614 A | 1/1959 | Renner et al. |
| 2,930,556 A | 3/1960 | Horlacher |
| 2,977,043 A | 3/1961 | Scheldorf |
| 3,220,212 A | 11/1965 | Fordsmand |
| 3,246,836 A | 4/1966 | Ayling |
| 3,250,461 A | 5/1966 | Parker |
| 3,292,884 A | 12/1966 | Scheldorf |
| 3,300,125 A | 1/1967 | Winkler |
| 3,396,908 A | 8/1968 | Vind |
| 3,444,854 A | 5/1969 | Fraim |
| 3,493,168 A | 2/1970 | Valbjorn |
| 3,672,349 A | 6/1972 | Derringer |
| 3,685,577 A | 8/1972 | Goodgion et al. |
| D226,381 S | 2/1973 | Harty, Jr. |
| 3,719,058 A | 3/1973 | Waygood |
| 3,724,442 A | 4/1973 | Gurney et al. |
| 3,727,537 A | 4/1973 | Harty, Jr. |
| 3,777,506 A | 12/1973 | Hergatt et al. |
| 3,836,290 A | 9/1974 | Carter |
| 3,855,814 A | 12/1974 | Eubank |
| 3,857,652 A | 12/1974 | Thayer |
| 3,865,182 A | 2/1975 | Blossom |
| 3,887,304 A | 6/1975 | Otaki et al. |
| 3,896,634 A | 7/1975 | Nagele et al. |
| 3,906,740 A | 9/1975 | Thomas |
| 3,973,939 A | 8/1976 | Abbott |
| 3,984,224 A | 10/1976 | Dawkins |
| 3,996,762 A | 12/1976 | Calme et al. |
| 4,045,074 A | 8/1977 | Howard |
| 4,143,902 A | 3/1979 | Johnstone |
| 4,192,542 A | 3/1980 | Hill |
| 4,213,309 A | 7/1980 | Pifer |
| 4,217,764 A | 8/1980 | Armbruster |
| 4,567,734 A | 2/1986 | Dankowski |
| D284,025 S | 5/1986 | Armstrong |
| 4,622,831 A | 11/1986 | Grupa |
| 4,628,702 A | 12/1986 | Boxum |
| 4,641,502 A | 2/1987 | Aldrich et al. |
| 4,662,350 A | 5/1987 | Mossbach |
| 4,672,818 A | 6/1987 | Roth |
| 4,674,294 A | 6/1987 | D Agaro |
| 4,699,207 A | 10/1987 | Hanemaayer |
| 4,709,623 A | 12/1987 | Roth et al. |
| 4,710,610 A | 12/1987 | Reifel et al. |
| 4,748,825 A | 6/1988 | King |
| 4,784,214 A | 11/1988 | Penson et al. |
| 4,787,210 A | 11/1988 | Brown |
| 4,788,487 A | 11/1988 | Picklesimer |
| D300,777 S | 4/1989 | Bales et al. |
| 4,888,959 A | 12/1989 | Brown |
| D306,341 S | 2/1990 | Bales et al. |
| 4,914,929 A * | 4/1990 | Shimazaki, Seiji | F25B 39/02 62/515 |
| 4,926,655 A | 5/1990 | King |
| 4,947,657 A | 8/1990 | Kalmbach |
| 5,001,905 A | 3/1991 | Miyazaki |
| 5,046,327 A | 9/1991 | Walker et al. |
| 5,054,378 A | 10/1991 | Speece |
| 5,095,716 A | 3/1992 | You |
| 5,123,258 A | 6/1992 | Brown et al. |
| 5,205,130 A * | 4/1993 | Pannell | F25B 1/00 62/134 |
| 5,246,196 A | 9/1993 | Rollett |
| 5,265,668 A | 11/1993 | Fisher |
| D343,676 S | 1/1994 | Lim |
| 5,307,645 A * | 5/1994 | Pannell | F25B 1/00 62/243 |
| 5,531,641 A | 7/1996 | Aldrich |
| 5,533,357 A | 7/1996 | Voorhis |
| 5,544,929 A | 8/1996 | Nagai |
| 5,588,301 A | 12/1996 | Deroche, Sr. |
| D386,735 S | 11/1997 | Krueger et al. |
| 5,727,998 A | 3/1998 | Krueger et al. |
| D395,704 S | 6/1998 | Thomas et al. |
| D396,097 S | 7/1998 | Thomas et al. |
| 5,848,536 A | 12/1998 | Dodge et al. |
| 5,878,592 A | 3/1999 | Borges et al. |
| 5,899,081 A | 5/1999 | Evans et al. |
| 5,927,090 A | 7/1999 | Ladendorf et al. |
| 5,960,157 A | 9/1999 | McGraw |
| 6,029,464 A | 2/2000 | Kil et al. |
| 6,076,363 A | 6/2000 | Morton |
| 6,116,037 A | 9/2000 | Burnett |
| 6,116,095 A | 9/2000 | Radle |
| 6,132,183 A | 10/2000 | Li et al. |
| 6,134,909 A | 10/2000 | Lyu |
| 6,149,513 A | 11/2000 | Lyu |
| 6,161,609 A | 12/2000 | Ahn |
| 6,196,914 B1 | 3/2001 | Lyu |
| 6,213,197 B1 | 4/2001 | Ebbeson |
| 6,257,013 B1 | 7/2001 | Murray et al. |
| 6,263,689 B1 | 7/2001 | Dodge et al. |
| 6,276,166 B1 | 8/2001 | Sarkisian et al. |
| 6,282,919 B1 | 9/2001 | Rockenfeller et al. |
| 6,302,780 B1 | 10/2001 | Ahn et al. |
| 6,345,513 B1 * | 2/2002 | Kim | F24F 13/20 62/448 |
| 6,357,248 B1 | 3/2002 | Bongaards et al. |
| 6,357,249 B1 | 3/2002 | Robinson et al. |
| 6,449,973 B2 | 9/2002 | Dodge et al. |
| 6,494,052 B1 | 12/2002 | Lee |
| 6,536,222 B1 | 3/2003 | Ahn et al. |
| 6,832,899 B2 | 12/2004 | Puff et al. |
| D502,255 S | 2/2005 | Kim |
| 6,857,953 B2 | 2/2005 | Malott |
| 6,925,826 B2 | 8/2005 | Hille et al. |
| 6,971,246 B2 | 12/2005 | Kurata et al. |
| 7,020,386 B2 | 3/2006 | Scime et al. |
| 7,036,332 B2 | 5/2006 | Hallin et al. |
| 7,047,760 B2 | 5/2006 | Holman, Jr. |
| 7,059,137 B2 | 6/2006 | Childress |
| 7,140,192 B2 | 11/2006 | Allen et al. |
| 7,171,822 B2 | 2/2007 | Allen et al. |
| 7,181,918 B2 | 2/2007 | Reinders |
| D544,589 S | 6/2007 | Yoo et al. |
| 7,234,315 B2 | 6/2007 | Allen et al. |
| 7,237,397 B2 | 7/2007 | Allen |
| D549,311 S | 8/2007 | Yoo et al. |
| D551,744 S | 9/2007 | Yoo et al. |
| D556,314 S | 11/2007 | Daniels, II et al. |
| D558,865 S | 1/2008 | Yoo et al. |
| D560,787 S | 1/2008 | Yoo et al. |
| 7,316,119 B2 | 1/2008 | Allen |
| 7,419,368 B2 | 9/2008 | Milks |
| D588,479 S | 3/2009 | Giese |
| D607,551 S | 1/2010 | Catrino |
| 7,739,882 B2 | 6/2010 | Evans et al. |
| D619,236 S | 7/2010 | Schlag et al. |
| 7,887,306 B2 | 2/2011 | Lee |
| D636,474 S | 4/2011 | Choi et al. |
| 7,963,117 B2 | 6/2011 | Allen et al. |
| 8,056,351 B2 | 11/2011 | Marciano et al. |
| 8,056,933 B2 | 11/2011 | Liptak |
| 8,141,377 B2 | 3/2012 | Connell et al. |
| D657,032 S | 4/2012 | Chouji |
| D657,033 S | 4/2012 | Chouji |
| D657,036 S | 4/2012 | Vetu et al. |
| D657,857 S | 4/2012 | Choi |
| D661,386 S | 6/2012 | Bergin |
| 8,240,168 B2 | 8/2012 | Holguin |
| 8,371,827 B2 | 2/2013 | Lilie et al. |
| 8,424,776 B2 | 4/2013 | Veettil et al. |
| 8,440,143 B2 | 5/2013 | Liptak |
| 8,535,127 B2 | 9/2013 | Malott |
| 8,568,209 B2 | 10/2013 | Boxum |
| D693,798 S | 11/2013 | Chuang et al. |
| D709,604 S | 7/2014 | Qin et al. |
| D712,531 S | 9/2014 | Bergin |
| D715,907 S | 10/2014 | Bergin |
| 8,869,547 B2 | 10/2014 | Nishino et al. |
| D716,925 S | 11/2014 | Bergin |
| 8,888,468 B2 | 11/2014 | Maganhoto et al. |
| 8,899,059 B2 | 12/2014 | Barnes et al. |
| D726,295 S | 4/2015 | Kim et al. |

(56) References Cited

U.S. PATENT DOCUMENTS

| | | | |
|---|---|---|---|
| D754,319 S | 4/2016 | Park et al. |
| 9,302,605 B1 | 4/2016 | Van Pelt |
| D762,289 S | 7/2016 | Schmidt et al. |
| D764,034 S | 8/2016 | Schmidt et al. |
| D764,035 S | 8/2016 | Schmidt et al. |
| 9,493,054 B2 | 11/2016 | Lewis et al. |
| 9,631,832 B2 | 4/2017 | Malott |
| D785,771 S | 5/2017 | Bergin |
| D785,772 S | 5/2017 | Bergin |
| 9,651,284 B2 | 5/2017 | Esch |
| D795,712 S | 8/2017 | Bergin et al. |
| 9,845,798 B2 | 12/2017 | Miguel et al. |
| D811,566 S | 2/2018 | Liu et al. |
| D812,208 S | 3/2018 | Samuels |
| D817,466 S | 5/2018 | Moseley |
| 9,975,405 B2 | 5/2018 | Siddiqui et al. |
| 9,995,294 B2 | 6/2018 | Miguel et al. |
| D824,387 S | 7/2018 | Oberpriller |
| D824,499 S | 7/2018 | Williamson et al. |
| D824,501 S | 7/2018 | Long et al. |
| 10,082,345 B1 | 9/2018 | Mihail |
| 10,093,152 B2 | 10/2018 | Allard et al. |
| 10,107,520 B2 | 10/2018 | Schmidt et al. |
| D834,961 S | 12/2018 | Bergin et al. |
| D841,138 S | 2/2019 | Williamson et al. |
| D850,609 S | 6/2019 | Bergin |
| D852,343 S | 6/2019 | Kosuge et al. |
| D862,668 S | 10/2019 | Moseley |
| D865,914 S | 11/2019 | Snyder |
| D865,926 S | 11/2019 | Moseley |
| 10,508,867 B2 | 12/2019 | Dowell, Jr. et al. |
| 10,589,593 B2 | 3/2020 | Westendarp et al. |
| 10,626,859 B2 | 4/2020 | Ki et al. |
| D884,870 S | 5/2020 | Bergin |
| D885,541 S | 5/2020 | Schumann |
| 10,675,941 B2 | 6/2020 | Williamson et al. |
| 10,696,129 B2 | 6/2020 | Bergin |
| 10,753,350 B2 | 8/2020 | Roh et al. |
| D903,075 S | 11/2020 | Huang et al. |
| D905,217 S | 12/2020 | Hederstierna et al. |
| D907,183 S | 1/2021 | Meda et al. |
| D914,186 S | 3/2021 | Brown et al. |
| 10,941,955 B2 | 3/2021 | Heral |
| D915,569 S | 4/2021 | Meda et al. |
| D917,036 S | 4/2021 | Hederstierna et al. |
| 11,034,208 B2 | 6/2021 | Williamson et al. |
| D940,289 S | 1/2022 | Hederstierna et al. |
| 11,639,083 B2 | 5/2023 | Henderson et al. |
| D1,018,813 S | 3/2024 | Hyon et al. |
| D1,027,143 S | 5/2024 | Hederstierna et al. |
| 2001/0027661 A1* | 10/2001 | Nishikawa ............ F24F 1/0057 248/220.1 |
| 2003/0160141 A1* | 8/2003 | Yamanashi ........ B60H 1/00535 248/300 |
| 2004/0040325 A1 | 3/2004 | Evans |
| 2005/0127697 A1 | 6/2005 | Berry |
| 2005/0160709 A1 | 7/2005 | Hollis |
| 2005/0193762 A1 | 9/2005 | Bae |
| 2006/0022904 A1 | 2/2006 | Kwak et al. |
| 2006/0052050 A1 | 3/2006 | Malott et al. |
| 2007/0151273 A1 | 7/2007 | Nelson et al. |
| 2007/0227693 A1 | 10/2007 | Allen et al. |
| 2007/0289325 A1 | 12/2007 | Stone |
| 2007/0295017 A1 | 12/2007 | Pannell |
| 2008/0014854 A1 | 1/2008 | Tigner |
| 2008/0110185 A1 | 5/2008 | Veettil et al. |
| 2008/0202138 A1 | 8/2008 | Pabisz et al. |
| 2008/0314072 A1 | 12/2008 | Plank et al. |
| 2009/0038774 A1 | 2/2009 | Ogiso et al. |
| 2009/0209193 A1 | 8/2009 | Kloster et al. |
| 2011/0030399 A1 | 2/2011 | Lifson et al. |
| 2011/0061414 A1 | 3/2011 | McAllister, II et al. |
| 2013/0205811 A1 | 8/2013 | Esch |
| 2013/0340982 A1 | 12/2013 | Johnson et al. |
| 2014/0223928 A1 | 8/2014 | Esch |
| 2015/0360568 A1 | 12/2015 | Champagne et al. |
| 2016/0288618 A1 | 10/2016 | Katoh et al. |
| 2016/0311288 A1 | 10/2016 | Mayo Mayo et al. |
| 2016/0311291 A1 | 10/2016 | Shimoyama et al. |
| 2016/0318368 A1 | 11/2016 | Alger et al. |
| 2017/0203632 A1 | 7/2017 | Westendarp et al. |
| 2019/0047353 A1 | 2/2019 | Williamson et al. |
| 2019/0047354 A1 | 2/2019 | Williamson et al. |
| 2019/0315197 A1 | 10/2019 | Williamson et al. |
| 2020/0132336 A1 | 4/2020 | Muderlak |
| 2020/0148028 A1 | 5/2020 | Westendarp et al. |
| 2020/0198438 A1 | 6/2020 | Liu et al. |
| 2020/0298655 A1 | 9/2020 | Williamson et al. |
| 2020/0338951 A1 | 10/2020 | Paci et al. |
| 2020/0376993 A1 | 12/2020 | Jun et al. |
| 2021/0061054 A1 | 3/2021 | Meda et al. |
| 2021/0061058 A1 | 3/2021 | Meda et al. |
| 2021/0061060 A1 | 3/2021 | Meda et al. |
| 2021/0207882 A1 | 7/2021 | Jurek |
| 2021/0239105 A1 | 8/2021 | Allard et al. |
| 2021/0276396 A1 | 9/2021 | Jurek |
| 2021/0354526 A1 | 11/2021 | Williamson et al. |
| 2022/0001718 A1 | 1/2022 | Jurek |
| 2022/0009306 A1 | 1/2022 | Hornung |

FOREIGN PATENT DOCUMENTS

| | | |
|---|---|---|
| AU | 2007202766 A1 | 1/2008 |
| AU | 2007237183 A1 | 6/2008 |
| AU | 2009233601 A1 | 6/2010 |
| AU | 2012261549 A1 | 1/2013 |
| AU | 354553 S | 3/2014 |
| AU | 360022 S | 1/2015 |
| AU | 360131 S | 1/2015 |
| AU | 360132 S | 1/2015 |
| AU | 367405 S | 3/2016 |
| AU | 201610870 S | 4/2016 |
| AU | 201611751 S | 5/2016 |
| AU | 201612249 S | 5/2016 |
| AU | 201613591 S | 7/2016 |
| AU | 201613592 S | 7/2016 |
| AU | 201613593 S | 7/2016 |
| AU | 20160101949 A4 | 12/2016 |
| AU | 2015289763 A1 | 1/2017 |
| AU | 2017100215 A4 | 3/2017 |
| AU | 201712794 S | 5/2017 |
| AU | 201712798 S | 5/2017 |
| AU | 2017200186 A1 | 8/2017 |
| AU | 201810968 S | 3/2018 |
| AU | 201810969 S | 3/2018 |
| AU | 201810970 S | 3/2018 |
| AU | 201810971 S | 3/2018 |
| AU | 201810972 S | 3/2018 |
| AU | 201810973 S | 3/2018 |
| AU | 201810975 S | 3/2018 |
| AU | 201810977 S | 3/2018 |
| AU | 201810978 S | 3/2018 |
| AU | 201816419 S | 1/2019 |
| AU | 201910037 S | 2/2019 |
| AU | 201910038 S | 2/2019 |
| AU | 201911094 S | 4/2019 |
| AU | 201912125 S | 6/2019 |
| AU | 2017364256 A1 | 6/2019 |
| AU | 2019202512 A1 | 10/2019 |
| AU | 201915241 S | 12/2019 |
| AU | 201916406 S | 12/2019 |
| AU | 201916408 S | 12/2019 |
| AU | 201916409 S | 12/2019 |
| AU | 2018366469 A1 | 5/2020 |
| AU | 202016120 S | 1/2021 |
| AU | 202016121 S | 1/2021 |
| AU | 202016122 S | 1/2021 |
| AU | 202016123 S | 1/2021 |
| CA | 2518348 A1 | 3/2006 |
| CA | 2578651 A1 | 8/2007 |
| CA | 2587994 A1 | 12/2007 |
| CA | 2611822 A1 | 5/2008 |
| CA | 2500519 C | 9/2009 |
| CA | 2686403 A1 | 5/2010 |

(56) References Cited

FOREIGN PATENT DOCUMENTS

| | | | |
|---|---|---|---|
| CA | 2906348 A1 | 9/2014 |
| CA | 2951956 A1 | 12/2015 |
| CA | 2954152 A1 | 1/2016 |
| CA | 166803 S | 3/2016 |
| CA | 166804 S | 3/2016 |
| CA | 165232 S | 5/2016 |
| CA | 165233 S | 5/2016 |
| CA | 167369 S | 12/2016 |
| CA | 170638 S | 12/2016 |
| CA | 167431 S | 2/2017 |
| CA | 172872 S | 2/2017 |
| CA | 172873 S | 2/2017 |
| CA | 172874 S | 2/2017 |
| CN | 1436677 A | 8/2003 |
| CN | 1657775 A | 8/2005 |
| CN | 101509717 A | 8/2009 |
| CN | 201392053 Y | 1/2010 |
| CN | 103237671 A | 8/2013 |
| CN | 103687735 A | 3/2014 |
| CN | 203623791 U | 6/2014 |
| CN | 104044432 U | 9/2014 |
| CN | 203920328 U | 11/2014 |
| CN | 104325923 A | 2/2015 |
| CN | 106470856 A | 3/2017 |
| CN | 106895502 A * | 6/2017 |
| CN | 106976376 A | 7/2017 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110293813 A | 10/2019 |
| CN | 110385958 A | 10/2019 |
| CN | 305397384 S | 10/2019 |
| CN | 111344168 A | 6/2020 |
| CN | 213237518 U | 5/2021 |
| CN | 213237945 U | 5/2021 |
| CN | 306672354 S | 7/2021 |
| CN | 306681352 S | 7/2021 |
| CN | 306901266 S | 10/2021 |
| DE | 2723318 A1 | 12/1978 |
| DE | 19654261 A1 | 6/1998 |
| DE | 19730136 A1 | 1/1999 |
| DE | 69503723 T2 | 4/1999 |
| DE | 69817899 T2 | 5/2004 |
| DE | 10255833 A1 | 6/2004 |
| DE | 10336767 B3 | 12/2004 |
| DE | 59812376 | 1/2005 |
| DE | 202004007924 U1 | 10/2005 |
| DE | 202005013530 U1 | 11/2005 |
| DE | 102004032920 A1 | 3/2006 |
| DE | 202004017266 U1 | 3/2006 |
| DE | 202005000560 U1 | 5/2006 |
| DE | 102005030362 B3 | 11/2006 |
| DE | 202006001377 U1 | 5/2007 |
| DE | 202007003764 U1 | 5/2007 |
| DE | 602004004480 T5 | 5/2007 |
| DE | 202006001374 U1 | 6/2007 |
| DE | 202006001376 U1 | 6/2007 |
| DE | 202006009803 U1 | 11/2007 |
| DE | 202007006292 U1 | 9/2008 |
| DE | 102007038443 A1 | 2/2009 |
| DE | 102007038716 A1 | 2/2009 |
| DE | 602005012194 | 2/2009 |
| DE | 202009003069 U1 | 6/2009 |
| DE | 202008003123 U1 | 7/2009 |
| DE | 102008028066 A1 | 12/2009 |
| DE | 602007009584 | 11/2010 |
| DE | 502007006725 | 4/2011 |
| DE | 202011101256 U1 | 11/2011 |
| DE | 202010012578 U1 | 12/2011 |
| DE | 102011053341 B4 | 5/2014 |
| DE | 202011002986 U1 | 6/2014 |
| DE | 202013004158 U1 | 8/2014 |
| DE | 102016220768 A1 | 4/2018 |
| DE | 112017000915 T5 | 10/2018 |
| DE | 102017207797 A1 | 11/2018 |
| DE | 102017214941 A1 | 2/2019 |
| DE | 102017219353 A1 | 5/2019 |
| DE | 112017005541 T5 | 8/2019 |
| DE | 102018204532 A1 | 9/2019 |
| DE | 102018206490 A1 | 10/2019 |
| DE | 102019205194 A1 | 10/2019 |
| DE | 102018206854 A1 | 11/2019 |
| DE | 202015009786 U1 | 2/2020 |
| DE | 212018000248 U1 | 2/2020 |
| DE | 212018000249 U1 | 2/2020 |
| DE | 112018003284 T5 | 3/2020 |
| DE | 112018003288 T5 | 4/2020 |
| DE | 102018222877 A1 | 6/2020 |
| DE | 112018005002 T5 | 7/2020 |
| DE | 112018005883 T5 | 7/2020 |
| DE | 102020203424 B3 | 7/2021 |
| DE | 112020000265 T5 | 9/2021 |
| DE | 102020206181 A1 | 11/2021 |
| DE | 102020206182 A1 | 11/2021 |
| DE | 102020206183 A1 | 11/2021 |
| EM | 005811890-0001 | 10/2018 |
| EM | 005811890-0002 | 10/2018 |
| EM | 005811890-0003 | 10/2018 |
| EM | 005811890-0004 | 10/2018 |
| EP | 0700801 A1 | 3/1996 |
| EP | 0869018 A2 | 10/1998 |
| EP | 0892225 A2 | 1/1999 |
| EP | 0863030 A2 | 12/2000 |
| EP | 1140533 B1 | 1/2003 |
| EP | 1502785 A1 | 2/2005 |
| EP | 1538009 A1 | 6/2005 |
| EP | 1538411 A2 | 6/2005 |
| EP | 1468852 B1 | 12/2005 |
| EP | 0921361 B1 | 2/2006 |
| EP | 1634740 A1 | 3/2006 |
| EP | 1721765 A1 | 11/2006 |
| EP | 1752717 A1 | 2/2007 |
| EP | 1826041 A1 | 8/2007 |
| EP | 1870270 A1 | 12/2007 |
| EP | 1925889 A2 | 5/2008 |
| EP | 1955946 A2 | 8/2008 |
| EP | 1988612 A2 | 11/2008 |
| EP | 1526974 B1 | 1/2009 |
| EP | 2048011 A1 | 4/2009 |
| EP | 2178710 A1 | 4/2010 |
| EP | 2189312 A1 | 5/2010 |
| EP | 2192040 A1 | 6/2010 |
| EP | 2196390 A1 | 6/2010 |
| EP | 2433658 A1 | 3/2012 |
| EP | 2616258 A1 | 7/2013 |
| EP | 2665611 A1 | 11/2013 |
| EP | 2994326 A1 | 3/2016 |
| EP | 3113965 A1 | 1/2017 |
| EP | 3241695 A2 | 11/2017 |
| EP | 3303965 A2 | 4/2018 |
| EP | 2714440 B1 | 5/2018 |
| EP | 3401619 A1 | 11/2018 |
| EP | 3411250 A1 | 12/2018 |
| EP | 3476630 A1 | 5/2019 |
| EP | 3543047 A1 | 9/2019 |
| EP | 3564564 A1 | 11/2019 |
| EP | 3592585 A1 | 1/2020 |
| ES | 1056812 U | 5/2004 |
| ES | 1056841 U | 5/2004 |
| ES | 1059964 U | 7/2005 |
| ES | 1059965 U | 7/2005 |
| FR | 2726352 A1 | 5/1996 |
| GB | 765498 A | 1/1957 |
| GB | 1127586 A | 9/1968 |
| GB | 2349687 A | 11/2000 |
| JP | S59 4307 U | 1/1984 |
| JP | 2005164231 A | 6/2005 |
| KR | 2000034096 A | 6/2000 |
| KR | 2000034097 A | 6/2000 |
| KR | 822168 B1 | 4/2008 |
| KR | 822169 B1 | 4/2008 |
| NL | 1011332 C2 | 8/2000 |

(56) References Cited

FOREIGN PATENT DOCUMENTS

| | | |
|---|---|---|
| RU | 2753994 C2 | 8/2021 |
| WO | 2000063036 A1 | 10/2000 |
| WO | 0206698 A1 | 1/2002 |
| WO | 2004090440 A1 | 10/2004 |
| WO | 2004098933 A1 | 11/2004 |
| WO | 2005108135 A1 | 11/2005 |
| WO | 2009021994 A1 | 2/2009 |
| WO | 2009055891 A1 | 5/2009 |
| WO | 2012034695 A1 | 3/2012 |
| WO | 2012113538 A1 | 8/2012 |
| WO | 2012159749 A1 | 11/2012 |
| WO | 2014143181 A1 | 9/2014 |
| WO | 2014180559 A1 | 11/2014 |
| WO | 2015013794 A1 | 2/2015 |
| WO | 2016011073 A1 | 1/2016 |
| WO | 2016120337 A1 | 8/2016 |
| WO | 2016166320 A1 | 10/2016 |
| WO | 2016189520 A2 | 12/2016 |
| WO | 2017143393 A1 | 8/2017 |
| WO | 2017143394 A1 | 8/2017 |
| WO | 2018096127 A1 | 5/2018 |
| WO | 2019025633 A1 | 2/2019 |
| WO | 2019025634 A1 | 2/2019 |
| WO | 2019025635 A1 | 2/2019 |
| WO | 2019025636 A1 | 2/2019 |
| WO | 2019038023 A1 | 2/2019 |
| WO | 2019082168 A1 | 5/2019 |
| WO | 2019097448 A1 | 5/2019 |
| WO | 2019207451 A2 | 10/2019 |
| WO | 2019229706 A1 | 12/2019 |
| WO | 2019244011 A1 | 12/2019 |
| WO | 2020151541 A1 | 7/2020 |
| WO | 2020188485 | 9/2020 |
| WO | 2020192746 A1 | 10/2020 |
| WO | 2021074841 A1 | 4/2021 |
| WO | 2021186414 A1 | 9/2021 |
| WO | 2021228601 A1 | 11/2021 |
| WO | 2021228605 A1 | 11/2021 |
| WO | 2021228620 A1 | 11/2021 |

OTHER PUBLICATIONS

Non-Final Office Action issued in U.S. Appl. No. 29/798,939 mailed on Jun. 8, 2023.
U.S. Appl. No. 63/061,462 titled "Modular Compressor Cooling Unit, Appliance, and Method Therefore" filed Aug. 5, 2020.
U.S. Appl. No. 17/579,442 titled "Heating Arrangement and Heat Distribution Unit for Such a Heating Arrangement" filed Jan. 19, 2022.
U.S. Appl. No. 17/673,080 titled "Recreational Vehicle, Cooling Device, Controlling System and Method for Controlling the Cooling Device" filed Feb. 16, 2022.
Ex-Parte Quayle Office Action issued in Design U.S. Appl. No. 29/936,908 mailed on Jul. 19, 2024.
Ex-Parte Quayle Office Action issued in Design U.S. Appl. No. 29/936,910 mailed on Jul. 30, 2024.
U.S. Appl. No. 17/477,343 titled "Mobile Air Conditioner" filed Sep. 16, 2021.
Non-Final Office Action issued in U.S. Appl. No. 17/477,343 mailed on Jan. 19, 2023.
Non-Final Office Action issued in U.S. Appl. No. 17/049,731 mailed on Jul. 7, 2023.
Final Office Action issued in U.S. Appl. No. 17/477,343 mailed on Aug. 14, 2023.
Advisory Action issued in U.S. Appl. No. 17/477,343 mailed on Oct. 27, 2023.
Notice of Allowance issued in U.S. Appl. No. 17/477,343 mailed on Dec. 6, 2023.
Corrected Notice of Allowance issued in U.S. Appl. No. 17/477,343 mailed on Feb. 14, 2024.
Corrected Notice of Allowance issued in U.S. Appl. No. 17/440,104 mailed on Feb. 23, 2024.
Corrected Notice of Allowance issued in U.S. Appl. No. 29/798,939 mailed on Feb. 9, 2024.
U.S. Appl. No. 18/439,008 titled "Mobile Air Conditioner" filed Feb. 12, 2024.
U.S. Appl. No. 29/936,908 titled "Housing Shroud and Housing for an Air Conditioner" filed Apr. 11, 2024.
U.S. Appl. No. 29/936,910 titled "Housing Shroud and Housing for an Air Conditioner" filed Apr. 11, 2024.
Corrected Notice of Allowance issued in U.S. Appl. No. 17/440,104 mailed on Apr. 8, 2024.
Australian application No. 201910037, "Air conditioner," filed on Jan. 4, 2019.
Australian application No. 201910038, "Air conditioner," filed on Jan. 4, 2019.
Australian application No. 201816419, "Air conditioner" filed on Oct. 26, 2018.
American RV Company, Dometic 459530 Duo Therm 13,500 BTU Brisk Air Conditioner High Efficiency Upper Unit Trailer Camper RV, Mar. 23, 2014 https://web.archive.org/web/20140323013456/http://www.americanrvcompany.com/Dometic-459530-Duo-Therm-13500-BTU-Brisk-Air-Conditioner-High-Efficiency-Upper-Unit-Trailer-Camper-RV Mar. 23, 2014.
American RV Company, Dometic 541815 High Performance 13,500 BTU Air Conditioner Upper Unit CCC2 Required Electronics Pre-Installed Camper Trailer RV, http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.
American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.
American RV Company, Dometic 541916 High Performance 15,000 BTU Air Conditioner Upper Unit Single Zone LCD Thermostat Required Electronics Pre-Installed Camper Trailer RV, http://www.americanrvcompany.com/Dometic-541916-High-Performance-15000-BTU-Air-Cond itioner-Upper-Unit-Single-Zone-LCD-Thermostat-Required-Electronics-Pre-Installed-Camper-Trailer-RV Mar. 23, 2014.
American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-I I-Camper-Trailer-RV Mar. 23, 2014.
Australian Patent Application No. 2019259641 titled "Damped Mobile Compressor" filed on Oct. 20, 2020.
Chinese application No. 201830607654.X, "Mobile Air conditioner," filed on Oct. 30, 2018.
Chinese application No. 201980028248.X "Damped Mobile Compressor" filed on Oct. 22, 2020.
Dometic Group: "Climate Control", http://www.dometic.com/enus/Americas/USA/RV-Products/climate, 2 pages.
Dometic Corporation, Dometic High Performance Air Conditioners, 2 pages, Jan. 1, 2011.
Dometic 2015 Product Catalog, Climate Control (2015).
Dometic 2016 Product Catalog, Climate Control (2016).
Dometic Duo-Therm, p. 140, Feb. 23, 2013.
Dometic Waeco Coolair RT 880; http://www.dometic.eo.uk/product/waeco-coolair-rt-880-2/ May 14, 2015.
European Patent Application No. 19727497 tiltled "Damped Mobile Compressor" filed Oct. 20, 2020.
European Design Application No. 005811890-0001-0004 tiltled "Mobile Air Conditioner" filed Oct. 29, 2018.
International Search Report for PCT application No. PCT/IB2019/053280 mailed on Oct. 24, 2019.
Invitation to Pay Additional Fees and Partial Search Report for PCT/IB2019/053280 mailed Aug. 19, 2019, 8 pages.
Notice of Allowance Issued in U.S. Appl. No. 29/645,887 mailed on Aug. 30, 2021.
PCT application No. PCT/IB2019/053280 titled "Damped Mobile Compressor" filed on Apr. 19, 2019.

(56) References Cited

OTHER PUBLICATIONS

PCT Application No. PCT/IB2020/052438 titled "Mobile Air Conditioner" filed on Mar. 17, 2020.
Restriction Requirement Issued for U.S. Appl. No. 29/645,887 mailed on May 21, 2021.
U.S. Appl. No. 17/440,104 titled "Mobile Air Conditioner" filed Sep. 16, 2021.
Design U.S. Appl. No. 29/798,939 titled "Housing Shroud and Housing for an Air Conditioner" filed Jul. 12, 2021.
U.S. Appl. No. 62/661,468, filed Apr. 23, 2018 entitled "Damped Mobile Compressor".
U.S. Appl. No. 63/175,304 titled "Mobile Air Conditioner" filed Apr. 15, 2021.
Design U.S. Appl. No. 29/645,887 titled "Mobile Air Conditioner" filed Apr. 30, 2018.
U.S. Appl. No. 17/049,731 tiltled "Damped Mobile Compressor" filed Oct. 22, 2020.
Corrected Notice of Allowance Issued in U.S. Appl. No. 29/645,887 mailed on Sep. 29, 2021.
International Preliminary Report on Patentability Issued in PCT Application No. PCT/IB2020/052438 mailed on Sep. 16, 2021.
Corrected Notice of Allowance Issued in U.S. Appl. No. 29/645,887 mailed on Oct. 14, 2021.
Corrected Notice of Allowance Issued in U.S. Appl. No. 29/645,887 mailed on Oct. 28, 2021.
Office Action Issued in China Application No. 201980028248.X mailed on Dec. 22, 2021.
Restriction Requirement Issued for U.S. Appl. No. 17/049,731 mailed on Jan. 25, 2022.
U.S. Appl. No. 62/819,711 titled "Mobile Air Conditioner" filed Mar. 18, 2019.
U.S. Appl. No. 29/767,929 titled "Air Conditioning Housing" filed Jan. 26, 2021.
U.S. Appl. No. 63/141,800 titled "Air Conditioning System for a Vehicle" filed Jan. 26, 2021.
U.S. Appl. No. 29/774,535 titled "Air Distribution Box" filed Mar. 17, 2021.
U.S. Appl. No. 29/641,674 titled "Control Panel" filed Mar. 23, 2018.
U.S. Appl. No. 29/645,887 titled "Mobile Air Conditioner" filed Apr. 30, 2018.
U.S. Appl. No. 29/715,592 titled "Filter Housing" filed Dec. 3, 2019.
U.S. Appl. No. 29/758,314 titled "Air Conditioning Apparatus" filed Nov. 13, 2020.
U.S. Appl. No. 29/760,605 titled "Air Conditioning Apparatus" filed Dec. 2, 2020.
U.S. Appl. No. 62/661,468 titled "Damped Mobile Compressor" filed Apr. 23, 2018.
U.S. Appl. No. 62/686,217 titled "Heating, Ventilation and Air Conditioning System with Illumination" filed Jun. 18, 2018.
U.S. Appl. No. 62/992,595 titled "Heating, Ventilation and Air Conditioning System with Illumination" filed Mar. 20, 2020.
European Patent Office Invitation to Pay Additional Fees for PCT/IB2020/052438 mailed Jul. 9, 2020, 9 pages.
European Patent Office International Search Report and Written Opinion for PCT/IB2020/052438 mailed Oct. 7, 2020, 18 pages.
Notice of Allowance issued in U.S. Appl. No. 17/440,104 mailed Oct. 31, 2023.
Notice of Allowance issued in U.S. Appl. No. 17/049,731 mailed on Nov. 14, 2023.
Office Action issued in DE Patent Application No. 102022203759.6 mailed on Nov. 30, 2023.
Notice of Allowance issued in U.S. Appl. No. 29/798,939 mailed on Jan. 2, 2024.
Notice of Allowability issued in U.S. Appl. No. 17/440,104 mailed on Jan. 19, 2024.
Non-Final Office Action issued in U.S. Appl. No. 17/049,731 mailed on Sep. 1, 2022.
Office Action Issued in China Application No. 201980028248.X mailed on Jul. 29, 2022.
Office Action issued in EP Application No. 19727497.0 mailed on Dec. 12, 2022.
Decision to Grant Issued in China Application No. 201980028248.X mailed on Jan. 4, 2023.
Patent Certificate Issued in China Application No. 201980028248.X mailed on Feb. 17, 2023.
Final Office Action issued in U.S. Appl. No. 17/049,731 mailed on Feb. 28, 2023.
Non-Final Office Action issued in U.S. Appl. No. 17/440,104 mailed on May 12, 2023.

\* cited by examiner

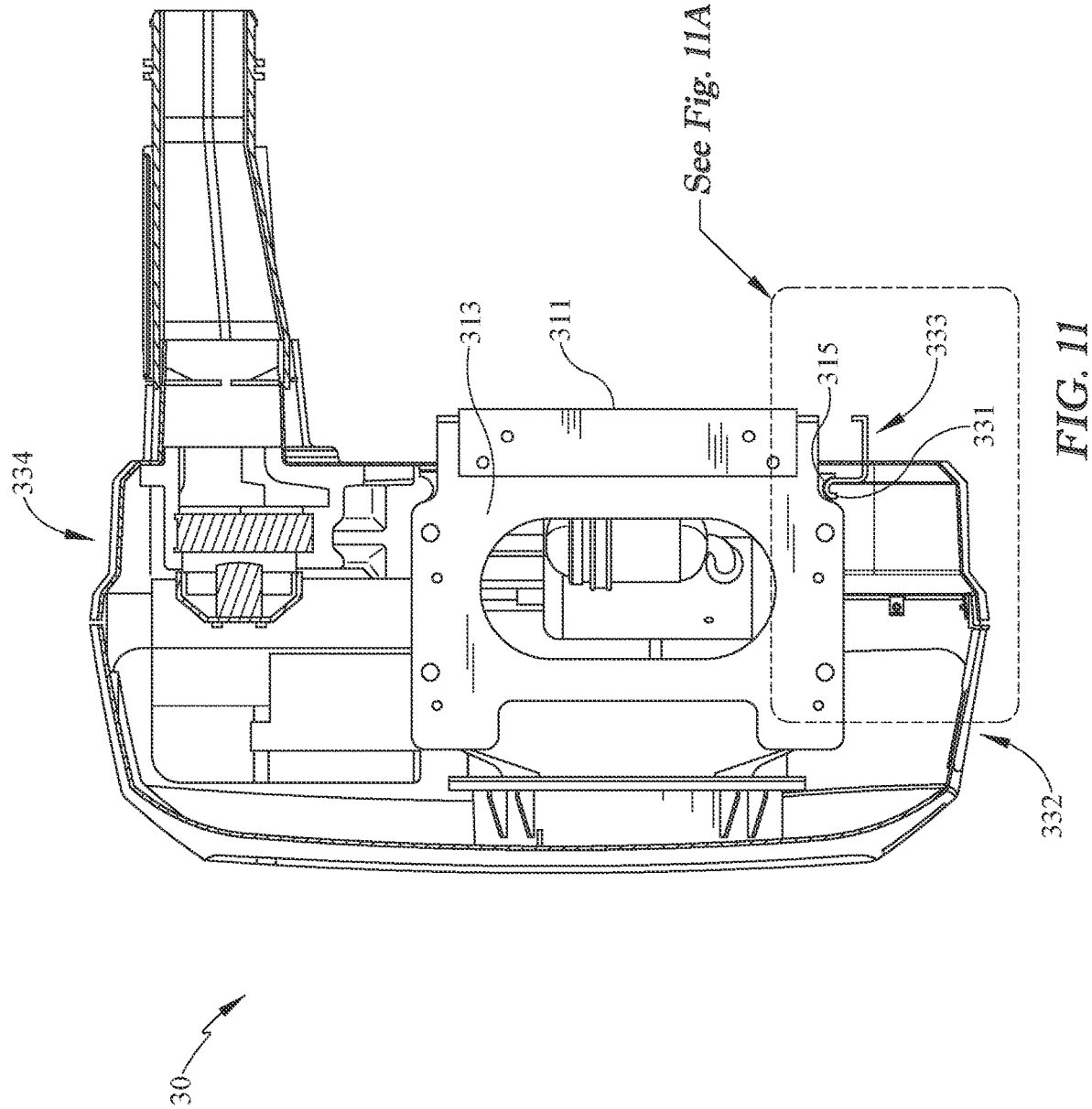

MOBILE AIR CONDITIONER

CLAIM TO PRIORITY

This continuation patent application claims priority to and benefit of, under 35 U.S.C. § 120, U.S. patent application Ser. No. 17/477,343, filed Sep. 16, 2021, which is a continuation-in-part application of and claims priority to U.S. patent application Ser. No. 17/440,104, a national stage entry application filed Sep. 16, 2021, which claims priority to and benefit of PCT Patent Application No. PCT/IB2020/052438, filed Mar. 17, 2020, which claims priority to and benefit of U.S. Provisional Patent Application No. 62/819,711, filed Mar. 18, 2019. The instant non-provisional application is a continuation of U.S. patent application Ser. No. 17/477,343, filed Sep. 16, 2021 which also claims priority to U.S. Provisional Patent Application No. 63/175,304, filed Apr. 15, 2021. All of the foregoing is incorporated by reference herein.

BACKGROUND

Present embodiments relate to an air conditioning system which is useful with a recreational vehicle ("RV") or truck. More specifically, present embodiments relate to heating, ventilation, and air conditioning (HVAC) systems, or alternatively air conditioning systems, which are mounted on a vertical surface of the RV or truck.

Currently HVAC systems, inclusive of mobile air conditioners, are typically mounted on the roof of an RV, truck (inclusive of buses and bus-type RVs). One downside of these mounting configurations is that the upper surfaces of these vehicles are sometimes flat which allows water to sit on the surface. Over time, mounting holes used to retain the HVAC system on the roof of the RV or truck can receive water as seal quality breaks down. It would be desirable to eliminate this source of leakage into the RV, truck or bus by positioning the HVAC system in such a manner as to reduce or eliminate this leakage from the upper surface.

It would be desirable to provide an air conditioning system that either maintains or improves current air conditioning performance while also reducing the potential for leaks.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

The present embodiments relate to an HVAC system which is externally mounted on a vertical surface of an RV, truck or bus. There is a desire is to eliminate, or at least substantially reduce, a potential leakage path, wherein water may sit on an upper surface of a vehicle and due to seal degradation near an HVAC system over long periods of time, may find a pathway in through the roof of the vehicle and to an interior thereof. By positioning the HVAC on a vertical surface, gravity works to move water downward and away from the HVAC system rather than allowing it to stagnate in an area around apertures through the outer skin or outer surface of the vehicle.

It may also be desirable to reduce interior and/or exterior noise from the HVAC system. It may also be desirable to reduce the physical size of the air conditioning system, if possible, while providing an easy to install system. The serviceability of the HVAC system should not be impacted while also controlling drainage of condensation, as well as the exhaust air movement. The HVAC system should have an interface for air conditioning ducting and also not be impacted by corrosion or dirt, which may have different affects due to this different mounting configuration.

According to some embodiments, a wall mount mobile air conditioner comprises a frame mount capable of connection to a wall of a recreational vehicle (RV), first and second brackets spaced apart to receive a frame, the frame having at least one curved edge, the at least one curved edge engaging a corresponding edge of a frame mount and allowing pivoting motion of the frame relative to the frame mount, a fastener extending from either the first bracket and the second bracket or the frame and extending through the other of the first bracket and the second bracket or the frame.

Optionally, the following features may be used alone with the wall mount AC or in combination with other features and the wall mount AC. The wall mount mobile air conditioner may further comprise a foam air box in the frame, the foam air box having a first portion and a second portion. The wall mount mobile air conditioner may further comprise a strap to capture the first and second portions together. The fastener may comprise a pin stud. The pin stud may extending from each of the first and second brackets to extend through the frame. The first and second brackets each may have a first arm and a second arm angled relative to the first arm. The first arm may be in a first plane and the second arm be in a second plane. Each of the first and second brackets connected to an RV at one of the first or second arm, and connected to the frame at the other of the first arm or second arm.

In some embodiments, a wall mount air conditioner may comprise a housing, a first pair of return air ducts and a second pair of discharge ducts extending horizontally from the housing, an evaporator air box, the first pair of return air ducts and the second pair of discharge ducts in flow communication with the evaporator air box, the evaporator air box being a first portion and a second portion which are retained in position by a strap, the housing having a shroud and a base, the housing and the base being oriented vertically.

In a further embodiment, a method of mounting an air conditioner comprises the steps of installing a frame mount, installing first and second brackets, pivoting an air conditioner frame on the frame mount from a first position to a second position, connecting the air conditioner frame to the first and second brackets in the second position.

In some embodiments, a mobile air conditioner may comprise a base pan wherein a plurality of air conditioning mechanicals are positioned, a compressor, an evaporator, a condenser, a fan, and an expansion valve defining the air conditioning mechanicals in the base, an air shroud disposed on the base pan, the air shroud enclosing the air conditioning mechanicals, a base extension extending from a surface of the base and configured to extend into an outermost substantially vertical surface of a recreational vehicle. At least one conditioned air duct connection and at least one return air duct connection within the base extension and through the base pan. At least one opening in one of the base pan or the air shroud, the at least one opening providing air flow to the condenser.

Optionally, various embodiments may also be utilized with the mobile air conditioner either alone or in combination of other embodiments. The mobile air conditioner may further comprise a rear camera window disposed in one of the shroud or the base pan. The mobile air conditioner may have two conditioned air duct connections for two zone conditioning. The mobile air conditioner wherein the air flow to the condenser is substantially horizontal. The mobile air conditioner may further comprise a return air flow from the condenser which is substantially vertical. The mobile air conditioner wherein the air flow to the condenser is substantially horizontal. The mobile air conditioner wherein a return airflow from said condenser is substantially horizontal. The mobile air conditioner may be powered by a 120V AC shore power source or a 12V DC source. The mobile air conditioner may be configured to be mounted on a rear surface of the recreational vehicle. The mobile air conditioner may having at least 20000 BTU cooling capacity. The shroud and the base pan may be fully separable or may be hingedly openable.

According to some embodiments, a mobile air conditioner may comprise a housing defined by a base pan and an air shroud, the housing configured to be connected to a vertical surface of an RV. A plurality of cooling mechanicals disposed within the housing, a frame capable of being connected to the RV or the housing, one of a pivot or catch disposed on said frame and the other of a pivot or catch disposed on or within the housing, and, the housing pivoting at the pivot and catch to rotate into an installation position for fastening.

According to some optional embodiments, the housing may have a duct aperture disposed in a vertical plane. The frame having a plurality of legs. One of the legs may have the pin or the catch. The housing has at least one frame or bracket where said pivot or catch is defined.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of a mobile air conditioning system will now be described by way of examples. These embodiments are not to limit the scope of the claims as other embodiments of a mobile air conditioning system will become apparent to one having ordinary skill in the art upon reading the instant description. Non-limiting examples of the present embodiments are shown in figures wherein:

FIG. 11 is a side section view of the mobile air conditioner of FIG. 10; and

DETAILED DESCRIPTION

Figure 1:
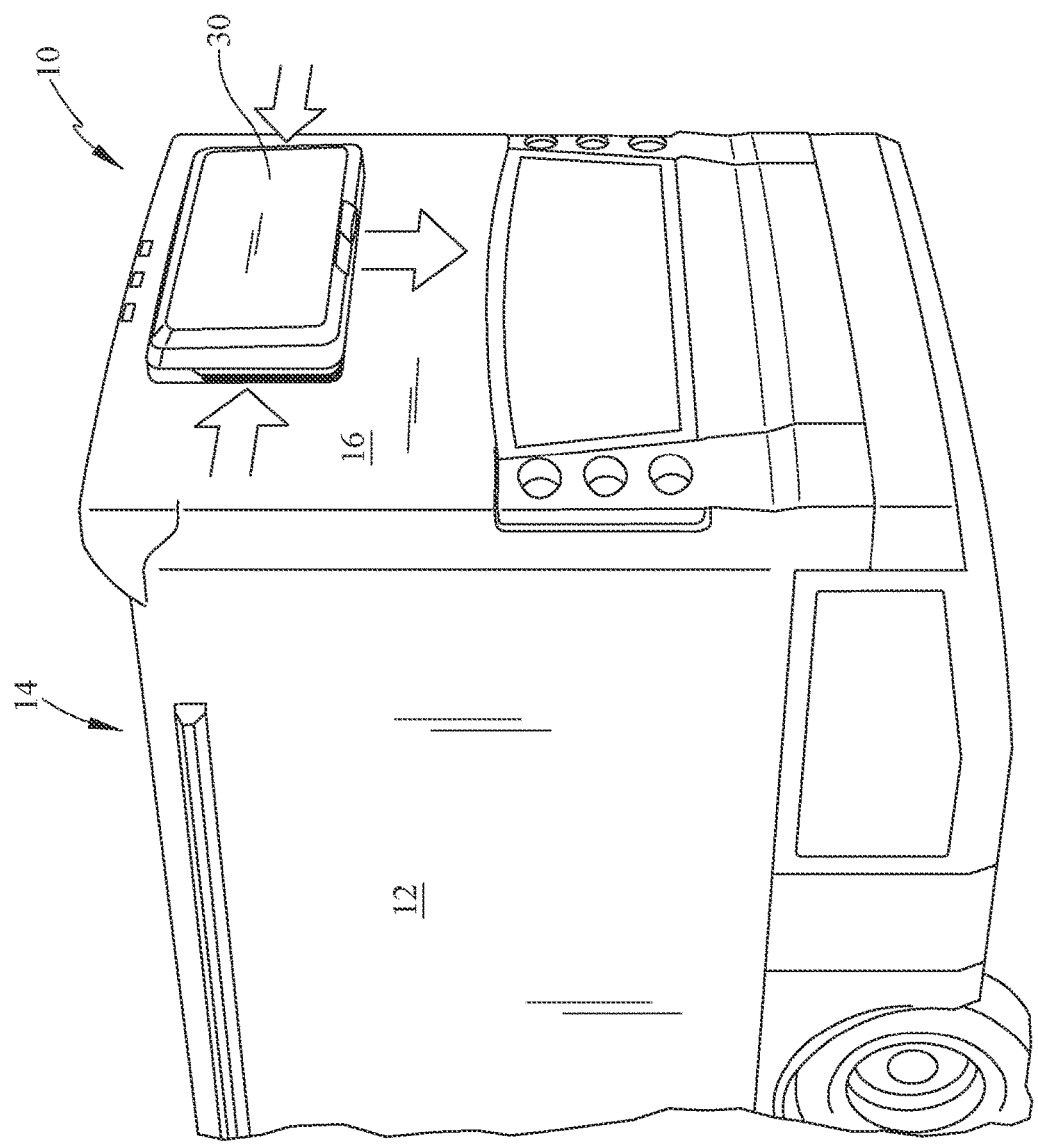
FIG. 1 is a perspective view of an RV with a mobile air conditioner (HVAC) system.

It is to be understood that a mobile air conditioning system is not limited in its application to the details of construction and the arrangement of components set forth in the following description or illustrated in the drawings. The described embodiments are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now to FIGS. 1-17, a mobile air conditioning or HVAC system 30 is provided which is mounted on a vertical surface of a mounting location such as an RV, bus, truck, vehicle, non-mobile structure, or the like. The HVAC system, or mobile air conditioner, allows for positioning on a vertical surface of a vehicle so that potential leakage paths are eliminated or reduced, which may occur in prior art systems. The system utilizes specific mounting structures to allow for the positioning on the vertical surface. Likewise, the vertically mounted air conditioner is generally self-enclosed such that the components of the air conditioner are positioned within the housing, defined by a base and an air shroud and likewise, such structure is designed on control air flow to and from the interior of the mobile air conditioner.

Referring now to FIG. 1, a perspective view of an RV 10 is provided with the mobile air conditioner 30 shown on a rear vertical wall or surface 16 of the RV. As used herein, the term "recreational vehicle" (RV) refers to mobile homes, motor homes, travel trailers, fifth wheels, recreational vans, buses and the like. A recreational vehicle may be one type of mobile unit. It should also be understood by one skilled in the art that the instant embodiment may be utilized with stationary structures having roof-mounted air conditioning units and air conditioning ducts extending through the ceiling area of the structure. Likewise, the embodiments of the instant disclosure are also suitable for use in various water crafts having exterior air conditioning units and duct work passing through cavities or spaces between the roof and ceiling. The depicted RV 10 includes a drive and transmission, not shown, as well as a sidewall 12, a roof 14, and a rear wall 16. Alternatively however, the RV may be in the form of a non-powered, pull-behind camper, non-mobile structure, and watercraft.

Figure 10:
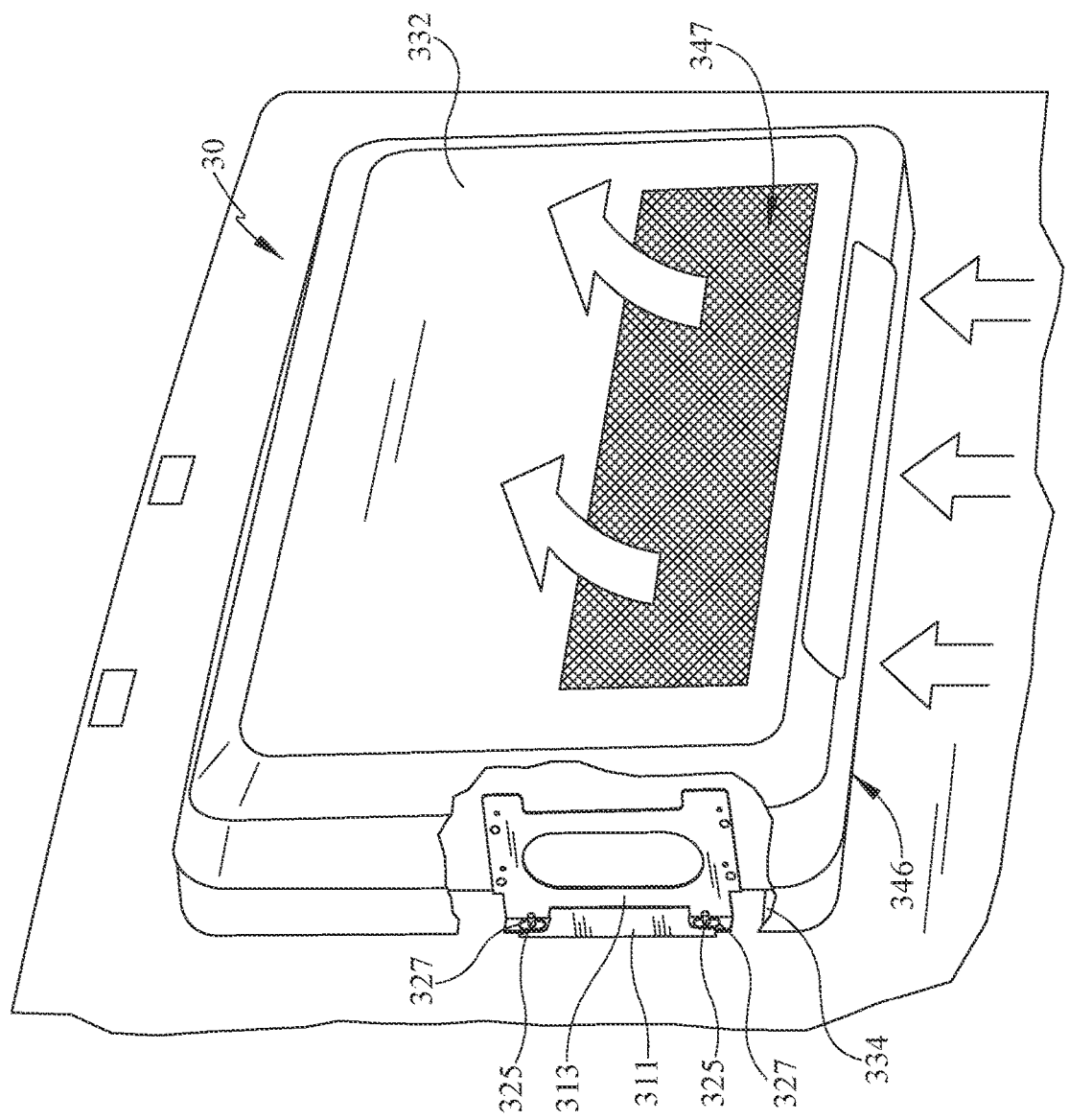
FIG. 10 is a perspective view of an alternate embodiment of a mobile air conditioner.

On the rear surface 16 of the RV 10, a portion of the mobile air conditioner 30 is depicted. The mobile air conditioner includes the air conditioner 30 and may or may not, include ducting extending within the RV, for example below the roof 14 but above the ceiling below to provide conditioned air to the interior of the vehicle 10. In some embodiments, the ducting may be located below the ceiling. In embodiments where ducting is not utilized, the system may also include an air distribution box (not shown) behind the mobile air conditioner 30 within the interior of the RV. The mobile air conditioner 30 may be mounted in a variety of fashions, including but not limited to, fasteners passing through the rear surface 16, for example to or through structural members or through a template therein or combinations, for non-limiting example. With the mobile air conditioner 30 mounted on a vertical surface, the air flow entering and exiting may be horizontal through an opening in a vertical plane or, as shown in FIG. 10 may alternatively enter through a lower surface (vertically) and exit through a vertical surface in a horizontal manner (or angled manner). The air flow into and out of the mobile air conditioner 30 may vary depending on the location of the cooling mechanicals 50 therein and the description is not exhaustive.

Figure 2:
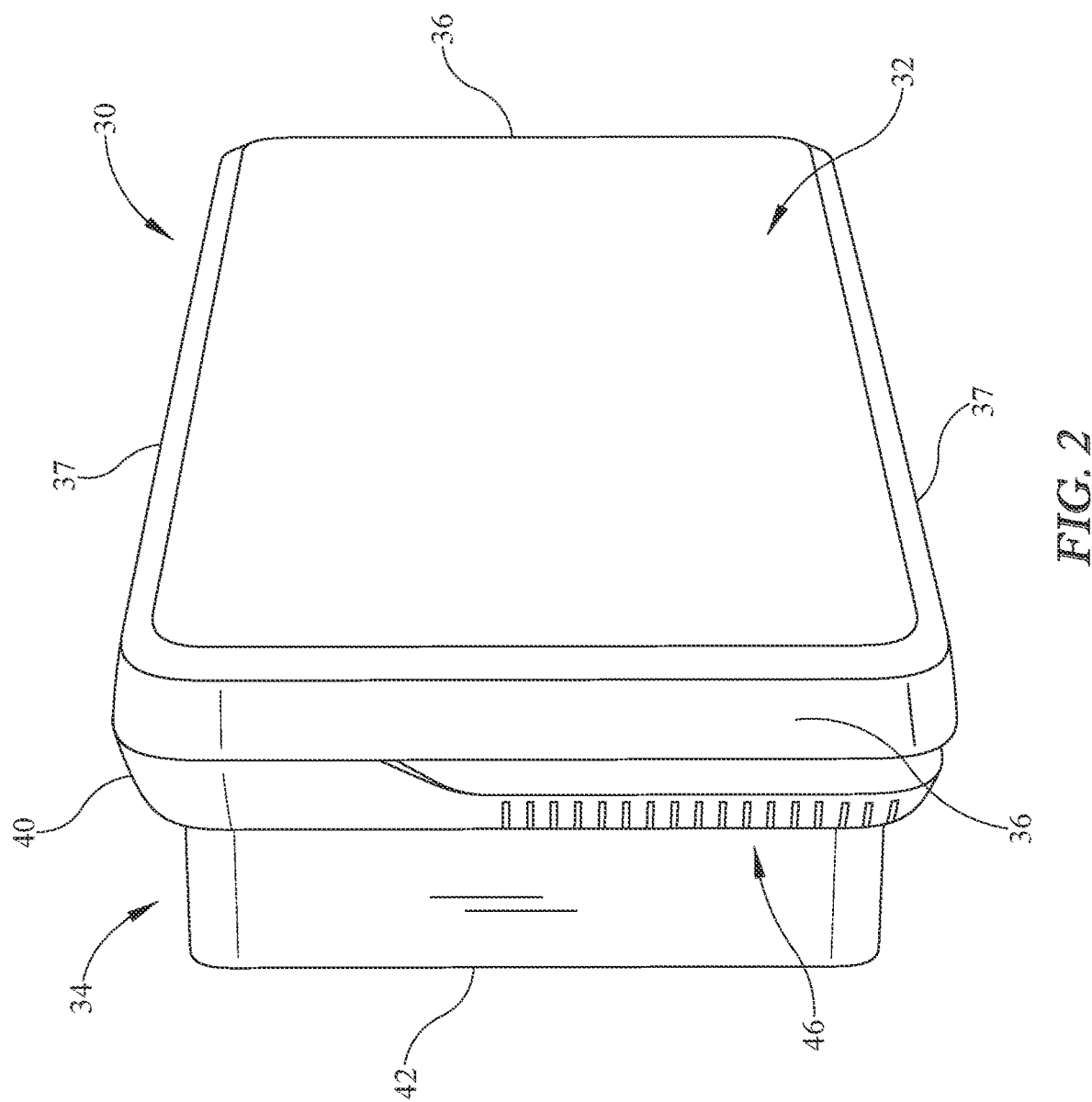
FIG. 2 is an exterior perspective view of the HVAC system removed from the RV.

Referring to FIG. 2, a perspective view of an illustrative mobile air conditioner 30 is shown removed from the RV 10. The mobile air conditioner 30 includes an air shroud 32 and a base 34, together defining a housing. In the example, the base 34 is closer to the RV 10 and the air shroud 32 is further. The base 34 may extend into the RV 10 for mounting and providing at least some amount of fluid communication between the mobile air conditioner 30 and any ducting or an HVAC supply grill, which may be on the interior of the RV 10. The base 34 may be of varying shapes and may be dependent upon the shape and size of ducting extending into the vehicle 10. The air shroud 32 may be of various shapes and according to the instant embodiment is generally rectangular having two parallel long sides 36 and two parallel short sides 37. The corners may be rounded or may be sharp edges and the surfaces may be smooth or textured, any of these features being within the ability of one skilled the art and related to design and aesthetic characteristics which may be desirable. The shape may be complimentary to a portion of the RV wall, in order to lower the profile, for example.

Figure 4:
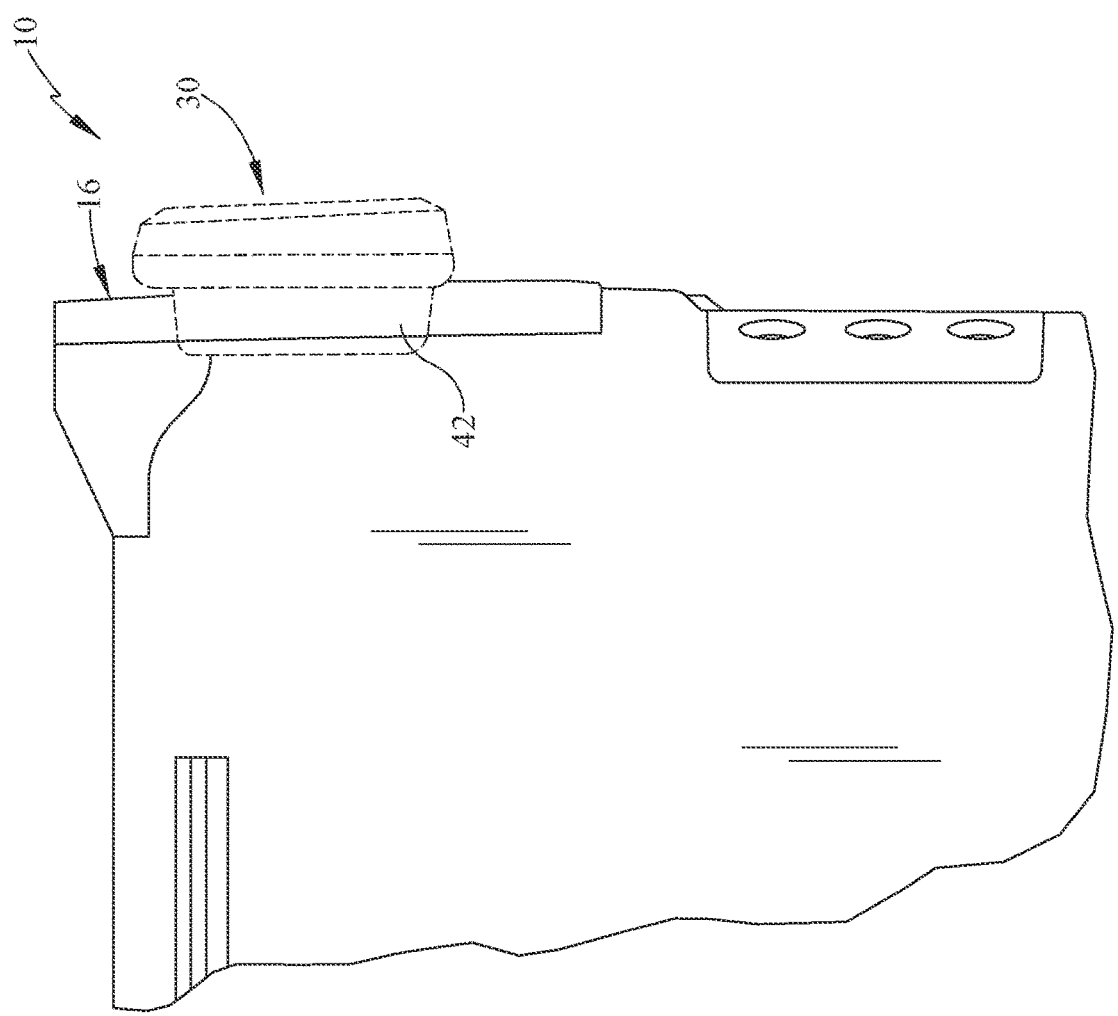
FIG. 4. is a side view of an RV and the HVAC system.

The base, or base pan, 34 may comprise a rim 40 which defines an interfacing portion with the air shroud 32 and may further comprise a base extension 42, which extends horizontally, as shown in FIG. 4, from the air shroud 32 and interfaces with a portion of the RV 10. The base extension 42 may extend inwardly through an outer boundary or periphery of the RV 10 in order to give the mobile air conditioner 30 a slim or low profile appearance. The base 34 may include an internal plate which connects to various mechanical components. The plate, which is hidden from view, may be flat or have structural strengthening corrugations or the like.

In some embodiments, the shroud 32 and the base 34 are separate structures such that the shroud 32 may be removed from the base 34 in order to access the internal components. Alternatively, in some embodiments, the two parts are hingedly connected so that they may be opened, without fully removing, in order to access the internal components within the housing. The hinge or other pivot structure may be one or more structures and may be located on any of the sides of the shroud 32 and base 34. In still other embodiments, the shroud 32 may also be pivoted open and removed. Other arrangements may be utilized to access the interior of the mobile air conditioning housing.

Figure 3:
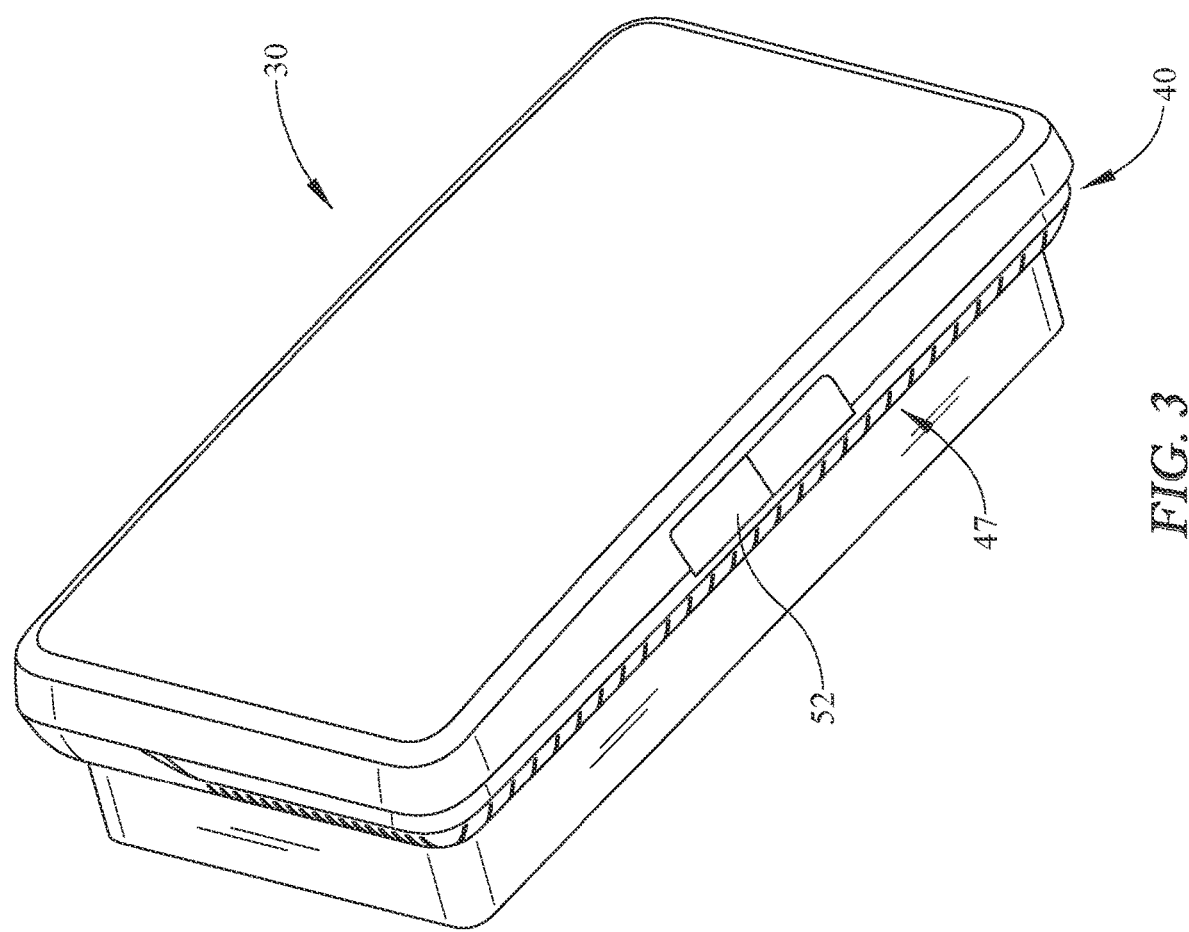
FIG. 3 is a lower perspective view of a bottom portion of the HVAC system.

Additionally, the air shroud 32 or the rim 40 may comprise a plurality of vent apertures or openings 46 which allow air flow to enter or exit the interior of the mobile air conditioner 30 and provide either an exit or entrance for air which is engaging with a condenser therein. Further, the apertures 46, 47 may allow mechanical component heat to dissipate. According to the instant embodiments, and with additional reference to FIG. 1, air flow may be provided in various directions but one illustrative embodiment may provide air flow in to the condenser from the vertical sides of the mobile air conditioner 30 at apertures 46 and may exit from the condenser through the apertures 47 (FIG. 3). Additional apertures may be provided either on the base 34 or the air shroud 32 to provide inlet flow into the mobile air conditioner 30, or in other locations. It may be desirable to either provide a deflector for any holes located along the upper surface or edges of the mobile air conditioner 30 or to not provide apertures on the upper surfaces so that rain or other contaminants do not fall into the mobile air conditioner 30. Also, baffles and/or ducts may be used to control air movement through the air conditioner 30. Further, as some motor coaches exhaust in the rear of the RV, it may be desirable to filter air moving into the mobile air conditioner. A filtration assembly may be provided in the area of the air passing into the mobile air conditioner 30 before the air reaches a condenser.

Referring now to FIG. 3, a lower perspective view of the illustrative mobile air conditioner 30 is depicted. Along the lower edge of the air shroud 32 or the rim 40 are a plurality of apertures 47 which allow for air flow into the mobile air conditioner 30. However, the direction of air flow may be varied. Also, as shown, the air shroud 32 may have a shape to engage or cover the base 34. While holes 47 are shown on the base 34, they may also be located on the air shroud 32. Further, the outer surface is shown with a flat surface, but may also have holes for ventilation, or the like Likewise, the outer surface may be contoured, for example to match or better approximate the wall of the RV.

Additionally, as best shown in this view, the mobile air conditioner 30 may have a window 52 wherein a camera may be located for rear view for the driver during parking or other scenarios where a rear camera is helpful with a large vehicle.

Referring now to FIG. 4, a side view of the RV 10 and the mobile air conditioner 30 is depicted. In this view, and with reference partially to FIGS. 2 and 3, the base extension 42 is better shown extending into the rear wall 16 of the RV 10. Accordingly, when viewed from the side or at an angle, the majority of the base extension 42 is not visible to a user and therefore gives the mobile air conditioner 30 a low profile appearance relative to the rear wall 16 of the vehicle 10. The base extension 42 may also provide a location of positioning of at least some mechanical components used for cooling rather than solely being located within the periphery of the base 34 and air shroud 32.

Figure 5:
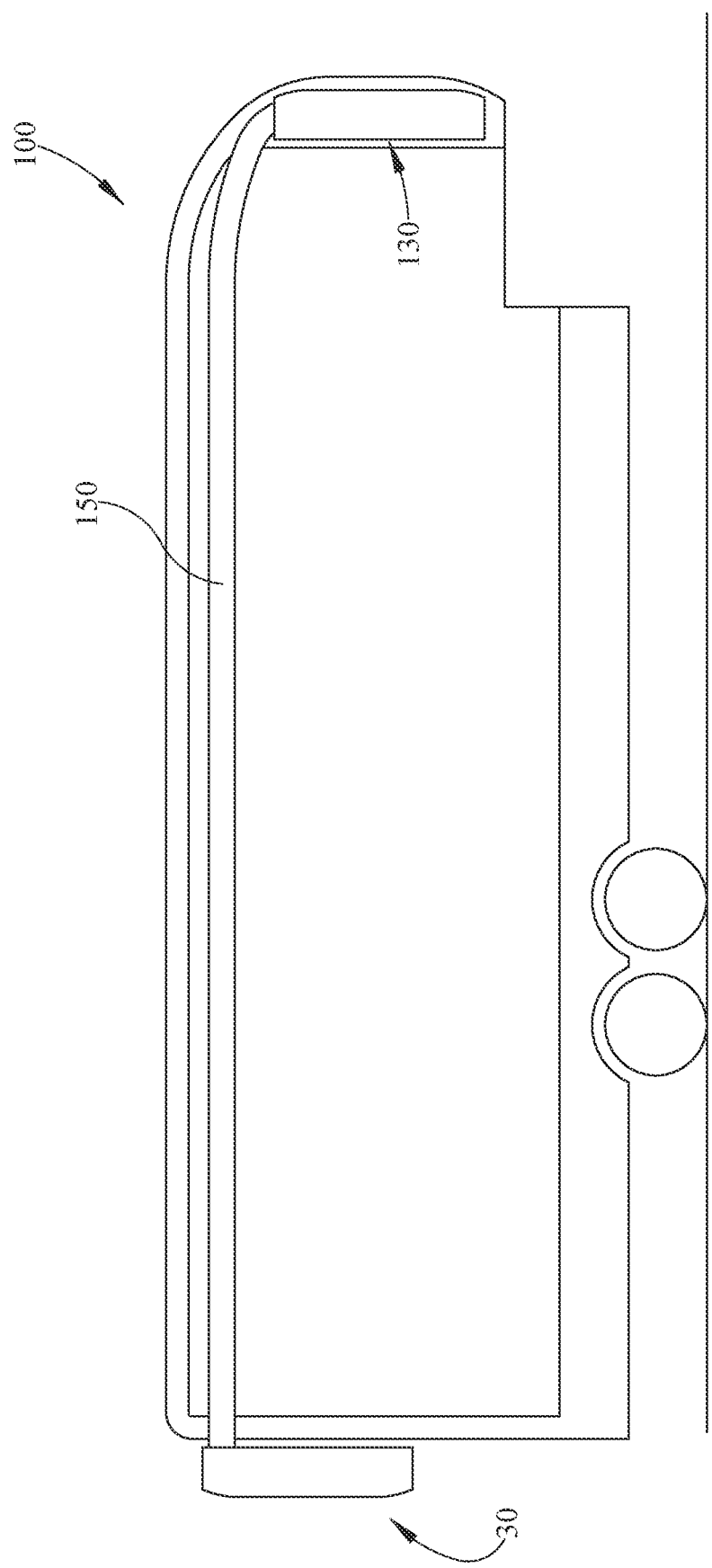
FIG. 5. is a side schematic view of an alternate RV with rear mounted AC and ducting system.

Referring now to FIG. 5, an illustrative side schematic is depicted of an RV 100. The RV 100 is a different type of RV than the RV 10 shown in previous views. The instant illustrative embodiment provides an RV which is towable rather than the self-propelled bus or coach, type RV shown in the first embodiments. However, the instant embodiment provides the mobile air conditioner 30 as again mounted on a rear surface of the RV 100, as shown. Further, the schematic view provides a schematic duct 150 which extends through the RV 100 and is utilized to supply and/or return conditioned air to the mobile air conditioner 30 at the rear of the RV 100. In some embodiments, a port at the rear of the RV 100 may have a register wherein return air from the interior of the RV 100 returns to the mobile air conditioner 30. In such embodiment, the duct 150 may be used to only to supply conditioned air to the RV 100. The instant embodiment also provides that an optional second mobile air conditioner 130 may also be used depending on the amount of conditioned air needed, i.e. capacity, to cool the RV 100. Accordingly, the instant embodiments may have one or more mobile air conditioners 30, 130 according to the scope of the instant claims.

The mobile air conditioners 30, 130 are both located on generally vertical surfaces of the RV 100 and the forward mobile air conditioner 130 may be positioned within a decorative cap which is common in larger mobile RVs. Accordingly, the mobile air conditioners may be externally positioned or may be covered.

Figure 6:
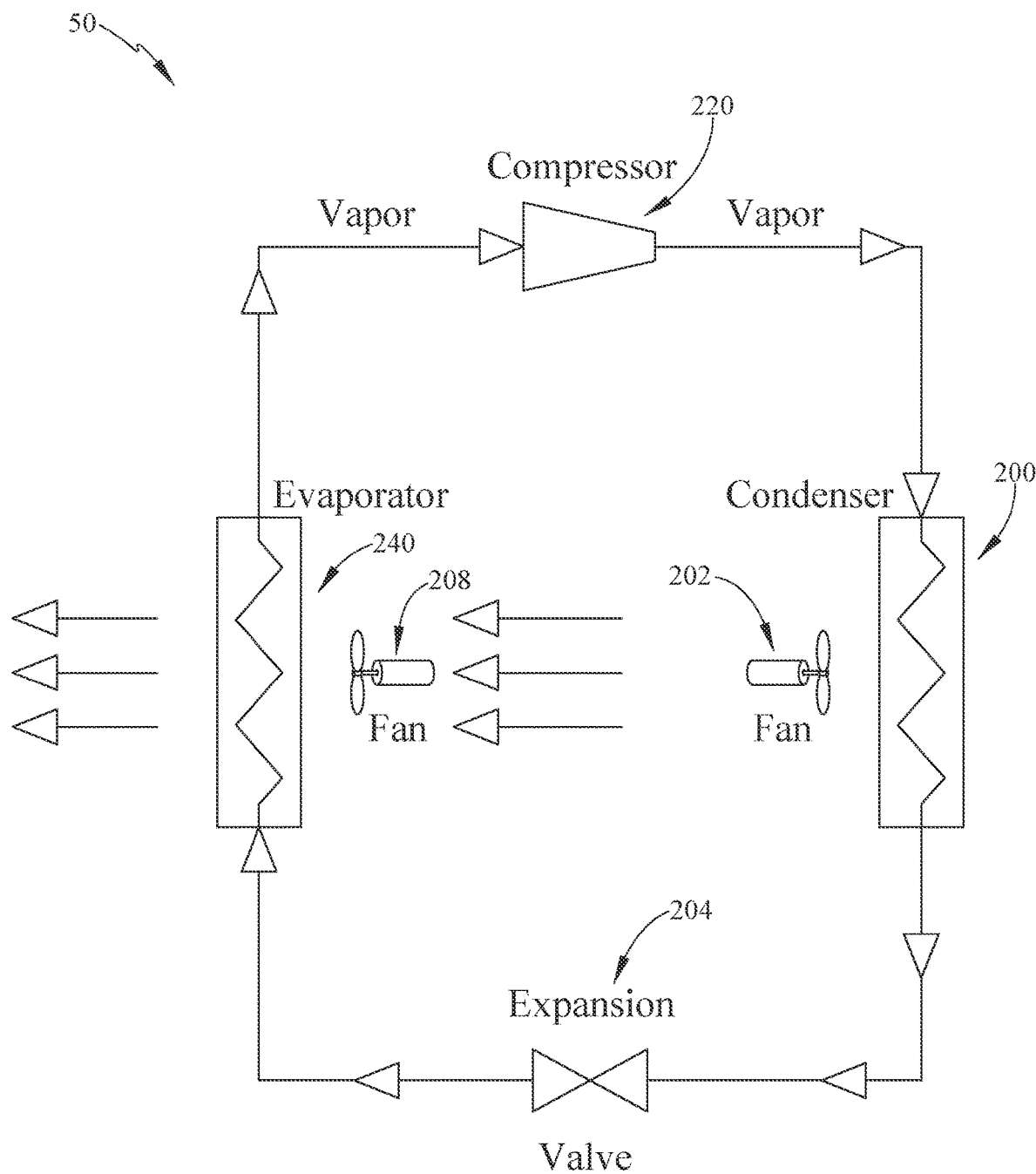
FIG. 6 is a schematic view of a compressor refrigeration system.

Referring now to FIG. 6, a schematic view of a compression refrigeration system 50 is depicted. Starting at the top of the drawing, a compressor 220 is depicted. The compressor 220 may be connected to a motor which drives the rotation or movement of the compressor 220 in order to compress a refrigerant. The compressor 220 may be a single speed, multi-speed, or variable speed compressor. Further, the compressor 220 may be a screw-type or may be a piston-cylinder type or various other types. The compressor 220 forces the compressed refrigerant along the schematic view toward a condenser 200. The condenser 200 may also comprise a cooling fan 202 which blows ambient air across a plurality of fins and/or coils which are in heat transfer communication with the refrigerant. The cooling fan 202 moves air across these fins and/or coils of the condenser 200 in order to reduce the temperature of the refrigerant. The refrigerant continues toward an expansion valve 204 which reduces the pressure of the refrigerant and then further on to an evaporator 240. A fan 208 may draw air from an interior of the RV 10 or other enclosed volume across the fins and/or coils of the evaporator 240 and return the conditioned air to the vehicle interior. At this time, the refrigerant is of a lower pressure and temperature such that the air blowing across coils carrying the refrigerant is cooled and returns into the enclosed space of the RV 10 as a conditioned, cooled air which is comforting to the users and of decreased humidity. After moving through the evaporator 240, the refrigerant returns to the compressor 220. At some position along the flow path of the refrigerant, a tank or other volume may provide a reservoir (not shown) for the refrigerant, according to some embodiments. This option merely is illustrative and very general of the operation of an air conditioner which may be utilized in any of the embodiments described. Further, variations of the described components of the system may also be implemented and be within the scope of the instant embodiments.

Figure 7:
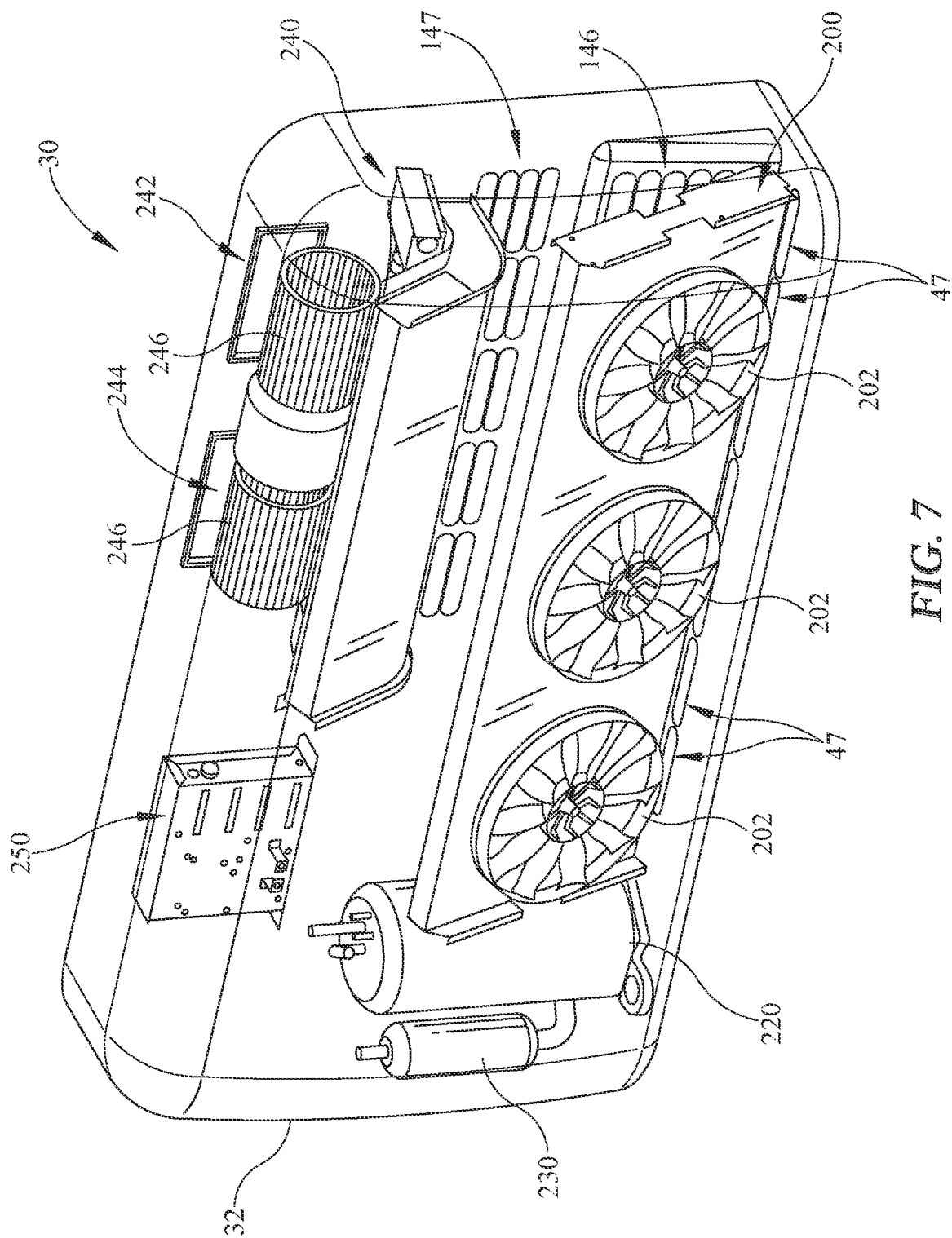
FIG. 7 is a front perspective view of one embodiment of an HVAC system.

Referring now to FIG. 7, a front perspective view of an embodiment of the mobile air conditioner 30 is depicted having a plurality of cooling mechanicals that form the example refrigeration cycle. The description of the refrigerant cycle is provided with regard to an embodiment. The air shroud 32 is shown having an alternative shape and further in transparent nature so that the interior components, which are illustrative, may be described. This view depicts a condenser assembly 200 which is utilized to direct air through condenser coils which are part of the condenser assembly 200 and reduce heat of the refrigerant.

Within the condenser assembly 200 are a plurality of fans 202, which pull ambient air into the mobile air conditioner 30 and across the plurality of condenser coils of the condenser assembly 200 before exhausting the air from the mobile air conditioner 30. The outside air may be pulled in a plurality of manners. For example, the apertures 46, 47 shown in FIGS. 2 and 3 may be utilized. Alternatively, the instant device utilizes apertures 146, 147 to provide air into and out of the mobile air conditioner 30.

Also shown within the mobile air conditioner 30, is at least one compressor 220. The compressor 220 contains a reservoir of refrigerant and utilizes a motor to power the compression action of the refrigerant, which is pumped to the condenser assembly 200. The compressor 220 may be defined by a plurality of types of devices including reciprocal compressors with piston cylinder structures, screw or axial rotating compressors or other types. Further, the motor for the compressor 220 may be a single speed or may be variable speed to further control the refrigerant flow. After the refrigerant flows from the compressor 220 through the condenser assembly 200, the refrigerant returns to an expansion valve 230 to reduce the pressure of the cooler refrigerant exiting the condenser assembly 200. After passing through the expansion valve 230, the pressure of the refrigerant is reduced some amount before it travels to an evaporator assembly 240. The evaporator assembly 240 may further comprise at least one fan 246 which is utilized to move air across the evaporator coils 248 (FIG. 8) and either push and/or pull air through the ducting of the RV 10. In the instant embodiment, two fans 246 are utilized and the fans 246 may have one or more motors so that the fans either work together or may be utilized independently of one another to increase functionality. The evaporator assembly 240 may comprise one or more fans 246 which are in fluid communication with air flow from within the RV via ducts and duct apertures 242, 244. These may represent outbound flow from the mobile air conditioner 30 or may represent both of supply and return air to the mobile air conditioner 30, and specifically the evaporator assembly 240. The evaporator assembly 240 also comprises a plurality of coils through which the refrigerant flows and air flow pulled from the interior or the RV passes over the evaporator coils 248 (FIG. 8) so that the air is cooled for returning back to the interior of the RV through the ducting. The duct apertures 242, 244 are arranged in a vertical plane and allow air flow movement in a horizontal direction.

The mobile air conditioner 30 may also have a controller 250 which is mounted in the base 34 or air shroud 32 or alternatively, may be mounted externally from the system. The controller 250 may provide control functionality for the fans 202 of the condenser assembly 200, the motor associated with the compressor 220, and the one or more motors associated with the fans 246 of the evaporator assembly 240. A controller may also work with wired and wireless communication modules, directly or indirectly, for communication with dedicated thermostat controls, smart device control, or control from remote communication via internet.

The refrigerant may be of various types. For example, some refrigerants which may be utilized include R-11 and R-12. HCFCs such as R-22, HFCs R-134a, R600a, R1234yf, and/or R1234e which is used in many cars have replaced most CFC use. HCFCs in turn are being phased out under the Montreal Protocol and replaced by hydrofluorocarbons (HFCs), such as R-410A, which lack chlorine. Still further, newer refrigerants may include supercritical carbon dioxide, known as R-744. These have similar efficiencies compared to existing CFC and HFC based compounds, and have lower global warming potential. These are merely examples however as other refrigerants may be used.

Figure 8:
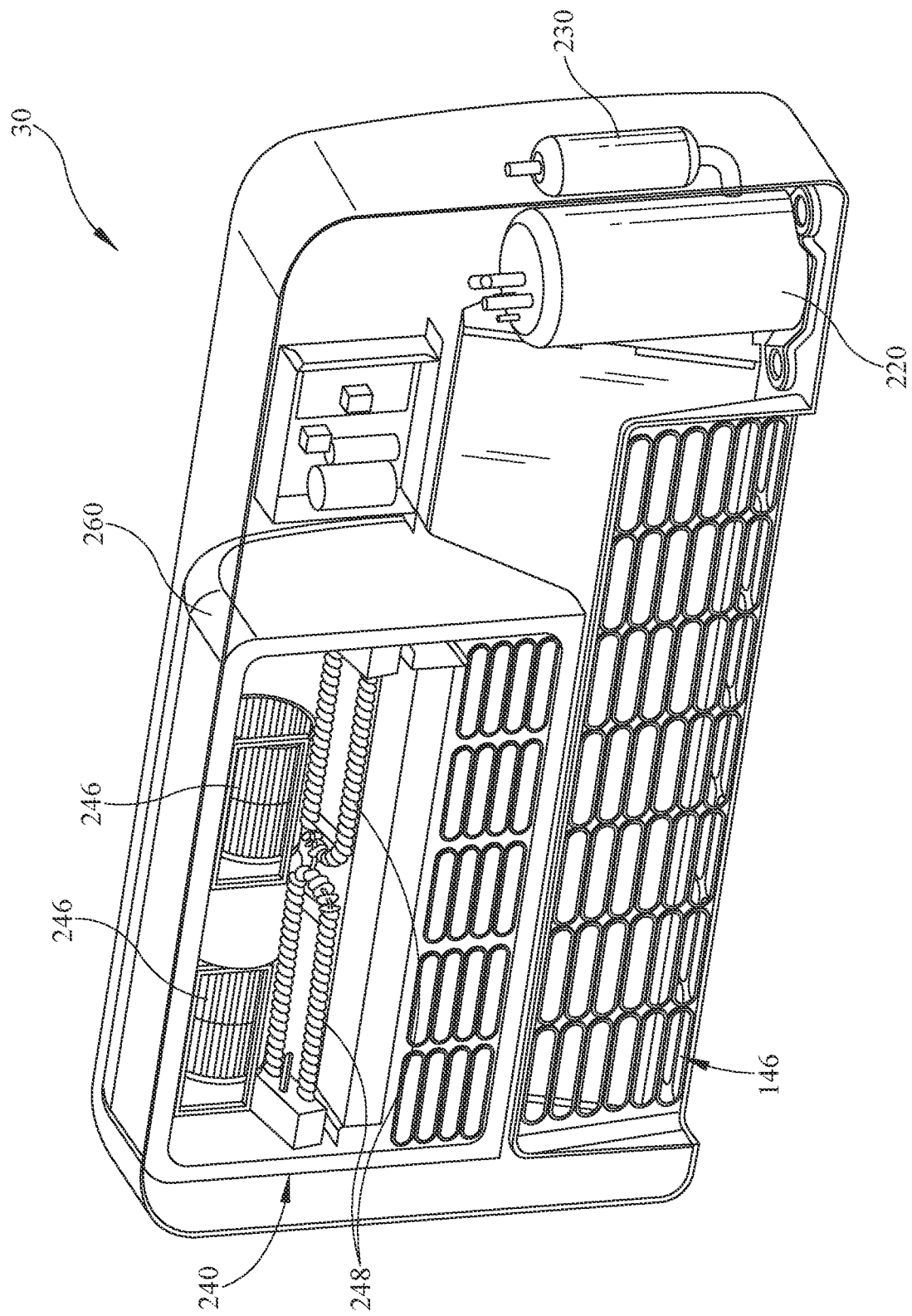
FIG. 8 is a rear perspective view of an illustrative HVAC system.

Referring now to FIG. 8, a perspective view of the mobile air conditioner of FIG. 7 is depicted from the rear of the mobile air conditioning system 30. In this view, the opposite side of the mobile air conditioner 30 is depicted and the evaporator assembly 240 is shown with the adjacent evaporator coils 248 adjacent to the fans 246. The coils receive refrigerant from the expansion valve 230 and air is pulled from the interior of the vehicle over the coils and through the ducts 242, 244 to return into the RV 10 conditioned and cooler air which is desirable within the RV 10. Also shown extending about the evaporator assembly 240 is an insulating layer 260 which decreases the interaction between the air flow for the condenser and the cool air of the conditioned air in flow communication with the interior of the RV 10.

Figure 9:
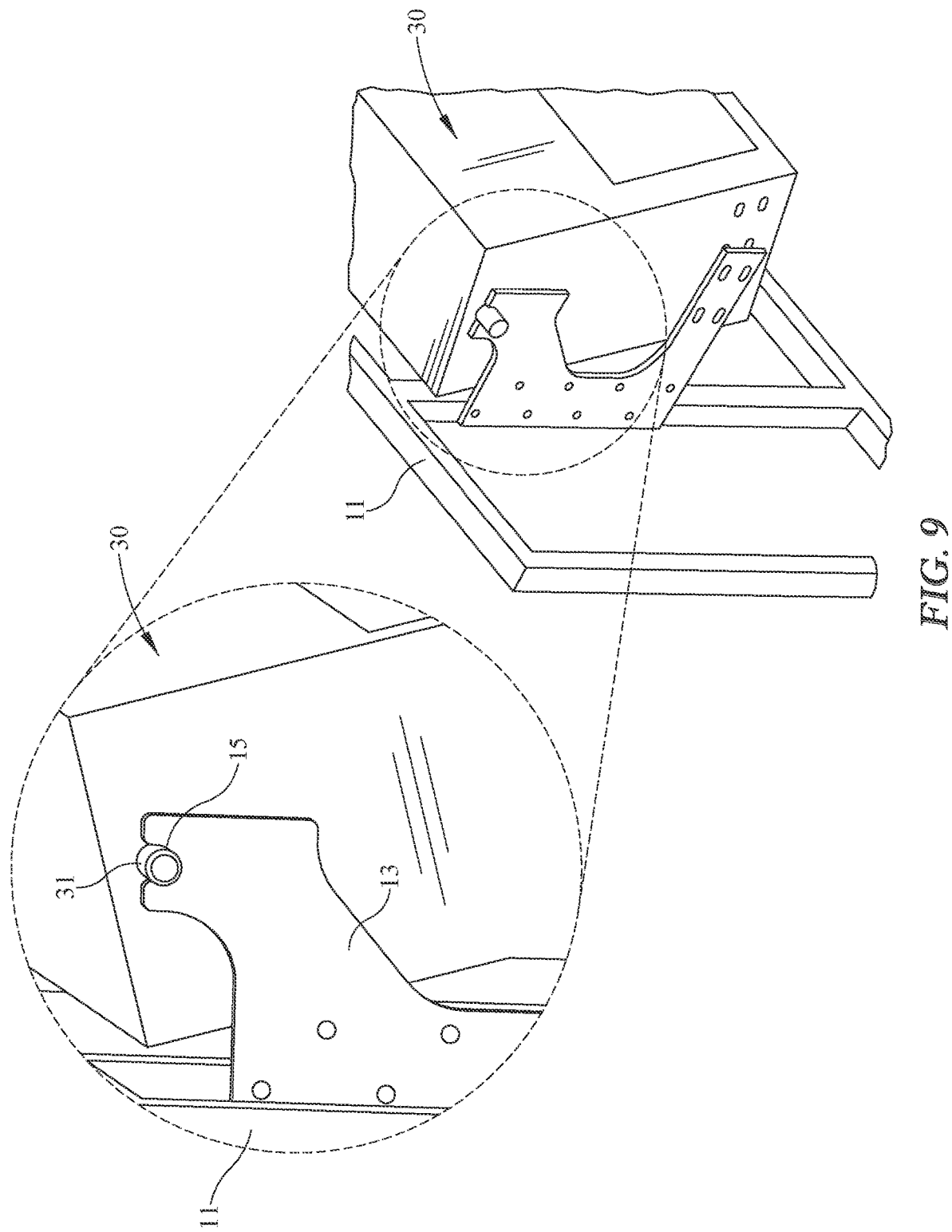
FIG. 9 is a schematic view of a mounting structure.

Referring now to FIG. 9, a schematic view of a mounting structure is provided. A frame 11 is shown which represents mounting structures on an RV 10 (FIG. 1). A bracket 13 is provided and connected to the frame 11. The bracket 13 may be generally C-shaped, as shown but other shapes may also be used. The bracket 13 is connected to the frame 11 to support the mobile air conditioner 30. The bracket 13 has an arm having a pin or pivot 31 or catch 15 at an upper end thereof which receives the other of a pin or pivot 31 or catch 15, or other member, which may extend from the mobile air conditioner 30. In some embodiments, the pin 31 or catch 15 may be reversed amongst the bracket 13 and RV 10. The mobile air conditioner 30 is shown generically as a box for purpose of this schematic but the pin 31 may extend from an interior frame of either the base 34 or the air shroud 32. The pin 31 is seated within the catch 15 and a crane or hoist may be utilized to make this positioning movement during manufacture or installation. Once the pin 31 is seated, the mobile air conditioner 30 can pivot into a position for bolting at the bottom of bracket 13. At the bottom of the bracket 13 may be a plurality of fastening holes which are aligned with the fastening holes of the mobile air conditioner 30. Upon alignment, fasteners may be used to seat the mobile air conditioner 30 in position. The duct work, for example duct 150 (FIG. 5), may include a seal material which positions in sealing arrangement with the mobile air conditioner 30 once the pin 31 is positioned in the catch and the mobile air conditioner 30 is pivoted to align the fastening holes with the bracket 13.

With reference now to FIG. 10, a rear perspective view of an alternate embodiment of a mobile air conditioner 30 having a housing defined by the air shroud 332 and the base or base pan 334. The embodiment provides a grill or other opening 346 located along the bottom for intake of air into the interior of the housing. The air is represented by the double line arrows and the air may be utilized by the condenser for heat exchange, as previously described. A grill or other opening 347 may be located on a rear surface to allow airflow to exit from within the housing. The grill or opening 347 is shown in the air shroud 332 and the openings 346 may be located in the base pan 334. However, the locations of the openings may be dependent upon the direction of the air flows entering and exiting, as previously discussed.

Additionally shown in this embodiment is an RV frame or bracket 311 which may be located on one of the RV 10 or the mobile air conditioner 30 and an alternate frame or bracket 313 for example on the mobile air conditioner 30. The RV frame 311 may include fasteners 325 which extend through attachment apertures 327 of the mobile air conditioner 30. The fasteners 325 may be defined by screws, rivets, threaded studs, press-fit studs, or other structures which can connect two elements. Alternatively, the fasteners 325 may also be located on the mobile air conditioner 30 and extend through apertures 327 in the RV frame 311.

Figure 11A:
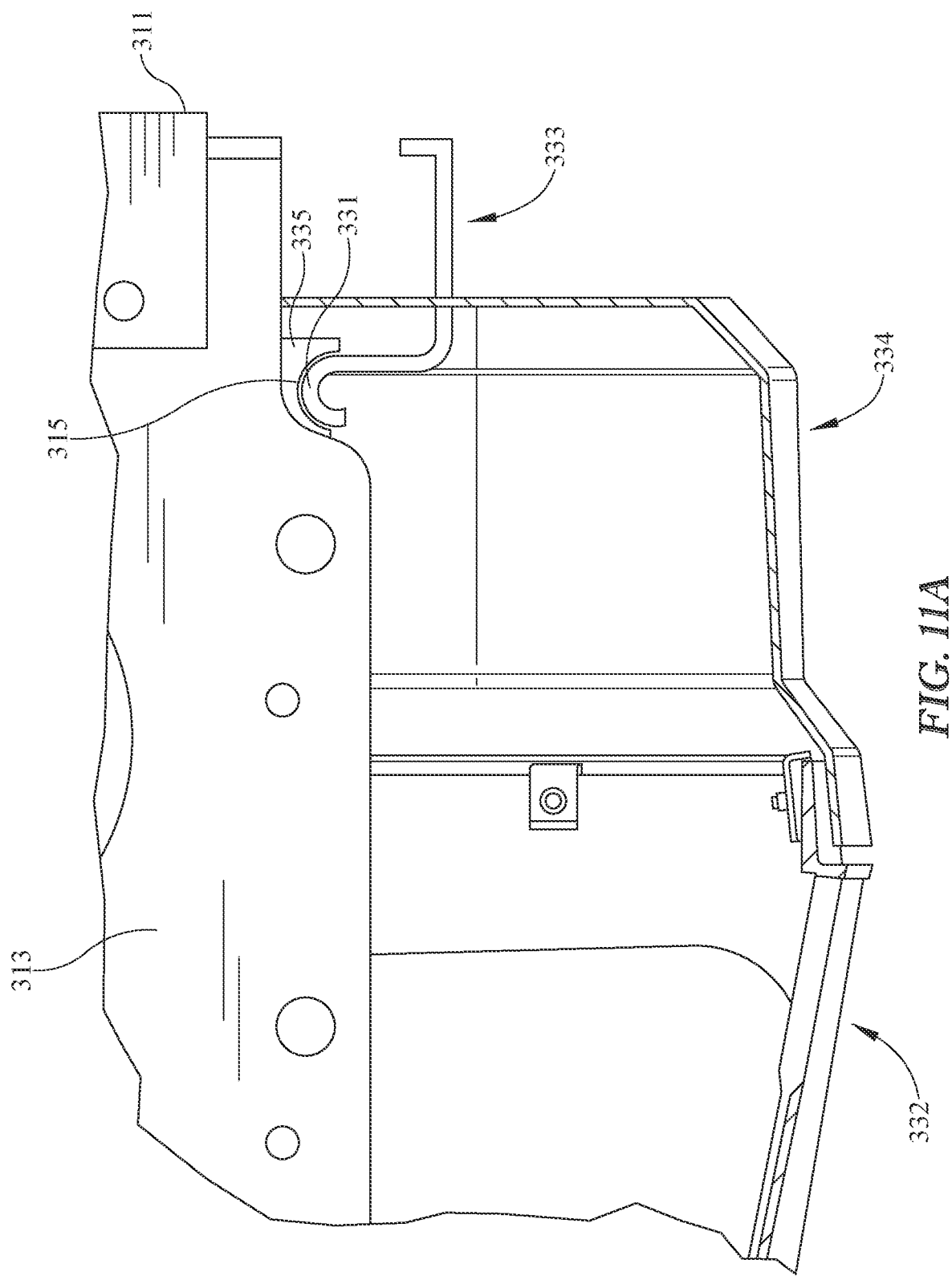
FIG. 11A is a detail view of the mobile air conditioner of FIG. 11.

With reference now to FIGS. 11 and 11A, side section view and a detail view are provided of the mobile air conditioner 30 of FIG. 10. The mobile air conditioner 30 of the instant embodiment is also pivoted into position for installation. Whereas the previous embodiment of FIG. 9 is pivoted into position at the upper end of the air conditioner, the instant embodiment is pivoted near a lower end of the mobile air conditioner 30.

In the instant embodiment, the RV 10 may include a frame member or other structure 333 having a pin or pivot 331. The pivot 331 engages a catch 315 which is formed within the air conditioner 30, for example on frame 313 or separate therefrom, so that during installation, the pivot 331 supports the catch 315. For example, a crane or hoist may be used to position and lower the air conditioner 30 onto the pivot 331 so that a surface of the catch 315 is seated on a corresponding surface of the pivot 331. As with the previous embodiment, the air shroud 332 and base pan 334 may be installed after the mobile air conditioner 30 is mounted to the RV. While the present embodiment provides separate RV frames or brackets 311 and 333, these may alternatively be formed by a single part. Likewise, one or more frames or brackets 333, 335 may be used in the housing of the mobile air conditioner 30 for support and connection to the RV 10.

Figure 12:
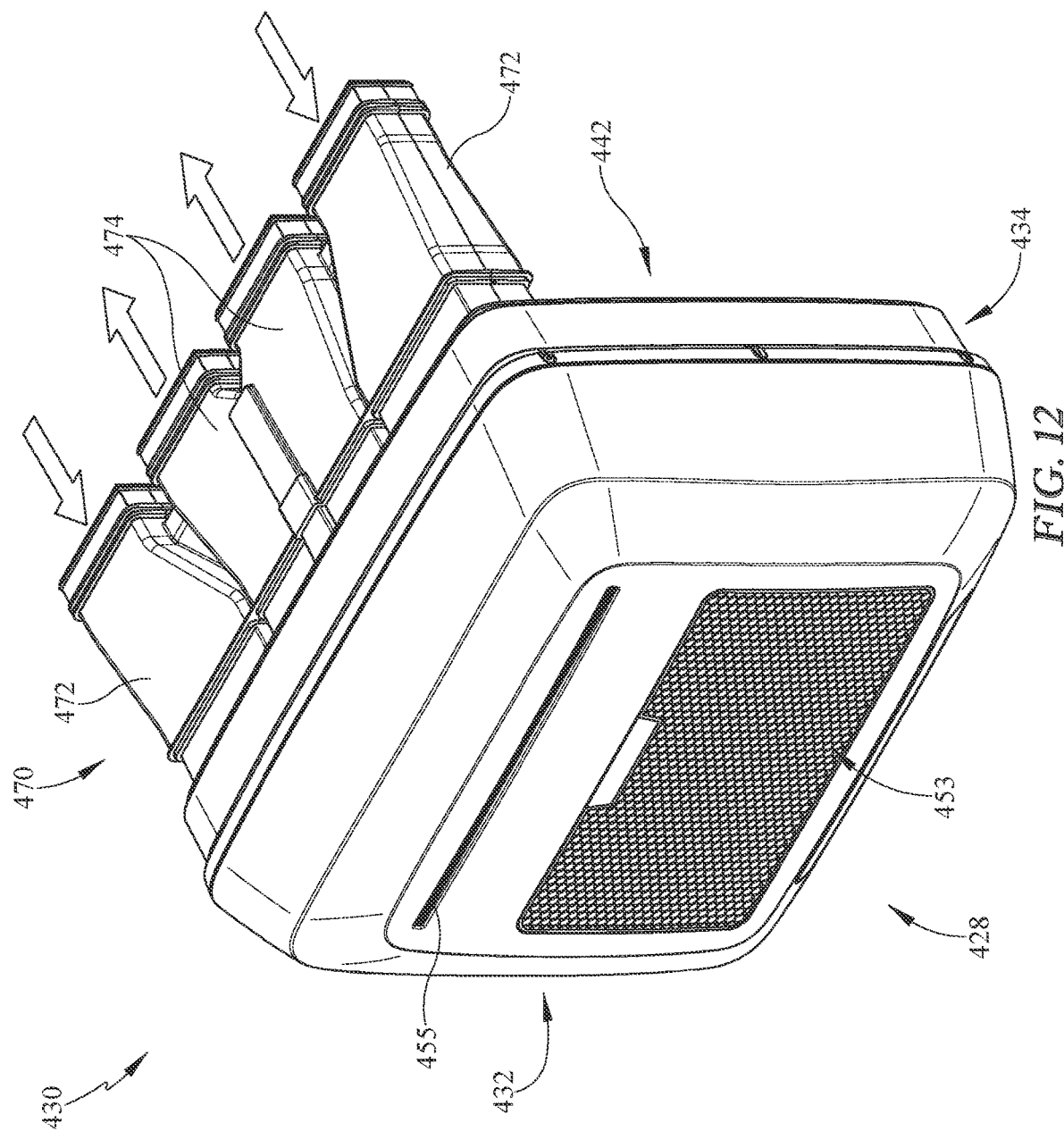
FIG. 12 is a perspective view of a mobile HVAC which may be mounted on a vertical wall.

Referring now to FIG. 12, a further embodiment of a mobile air conditioner 430 is provided and as with previous embodiments the air conditioner may also be a heating ventilation and air conditioning (HVAC) system. The upper perspective view shows a shroud assembly 428 defined by a shroud 432, a base 434, and optionally a base extension 442. The base 434 and the base extension 442 may be formed independently and connected or may be formed as a single structure. The shroud 432 is connected to the base 434 wherein the plurality of cooling mechanicals 450 (FIG. 13) are located. The shroud 432 and the base 434 may also be formed separately and/or may be hingedly connected during manufacture or installation.

On a rear surface of the shroud 432, a shroud grill 453 may be located for ventilation of a condenser, expansion valve, compressor and/or other cooling mechanicals. Above the grill 453 is a slot 455 wherein a clearance light, brake light or the like luminaire may be located. Such light may, for example, may be a light emitting diode, OLED, or some other type in non-limiting embodiments.

Extending from a forward side of the mobile air conditioner 430 are a plurality of ducts 470. The depicted embodiment provides four ducts that are positioned in a lateral direction across an upper area of the base extension 442. While the ducts 470 extend across the top of the mobile air conditioner 430, the ducts 470 may alternately extend at a differing height or elevation of the device. Further, while the ducts also extend laterally, they may also be arranged in alternate configurations. The laterally outward ducts may be, for example, return ducts 472, which return air from the air conditioned space, in the RV for example, to the air conditioner 430. The inward or centrally located ducts 474 may be, for example, discharge or supply ducts 474, which push air to the air conditioned space in the RV. Further, while four ducts are shown in this example, this is an example and other numbers, shapes, or sizes of ducts may be utilized to supply and return air to the RV.

As in previous embodiments, some portion of the mobile air conditioner 430 may be disposed through or within a vertical wall of a vehicle 10, for non-limiting example, connected to a frame of a recreational vehicle RV. In the depicted example, the ducts 472, 474 and a portion of the base extension 442 and/or base 434 may extend through the wall of the RV 10.

Figure 13:
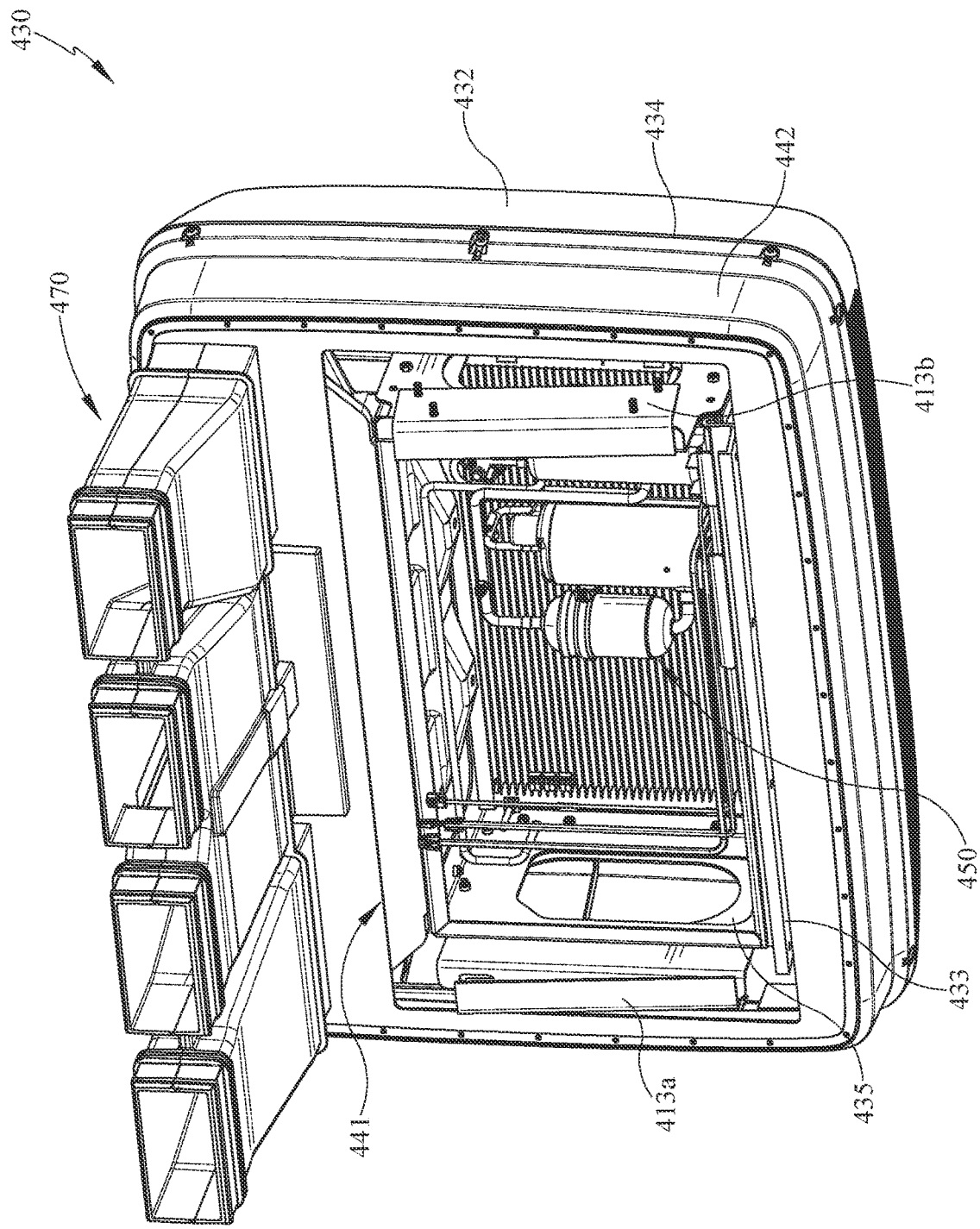
FIG. 13 is an alternate perspective view of the mobile HVAC of FIG. 12.

With reference now to FIG. 13, a second perspective view shown from an angle opposite that of FIG. 12. The base 434 and base extender 442 are shown with an opening 441 revealing some of the cooling mechanicals 450 within the base 434 and shroud 432.

The view also shows structures which allow for connection of the mobile air conditioner 430 to a generally vertical wall of the vehicle. For example, near the bottom edge of the opening, a frame mount 433 is shown. The frame mount 433 is a member that is connected to structural frame members of the RV and extends horizontally. The frame mount 433 may comprise various shapes and in some embodiments may be channel shaped.

Disposed near ends of the frame mount 433 are first and second brackets 413a, 413b which in some examples are also connected to the RV. The brackets 413a, 413b and the frame mount 433 may be installed in or to the RV structural members and subsequently, the HVAC frame 435 is pivotally supported by the frame mount 433 so that the frame 435 and remainder of the mobile air conditioner 430 can pivot forward. In this forward position, the frame 435 may be connected to the brackets 413a, 413b and retained in position. In this way, there are three structural supporting engagements between the frame 435 of the mobile air conditioner 430 and the RV.

Figure 14:
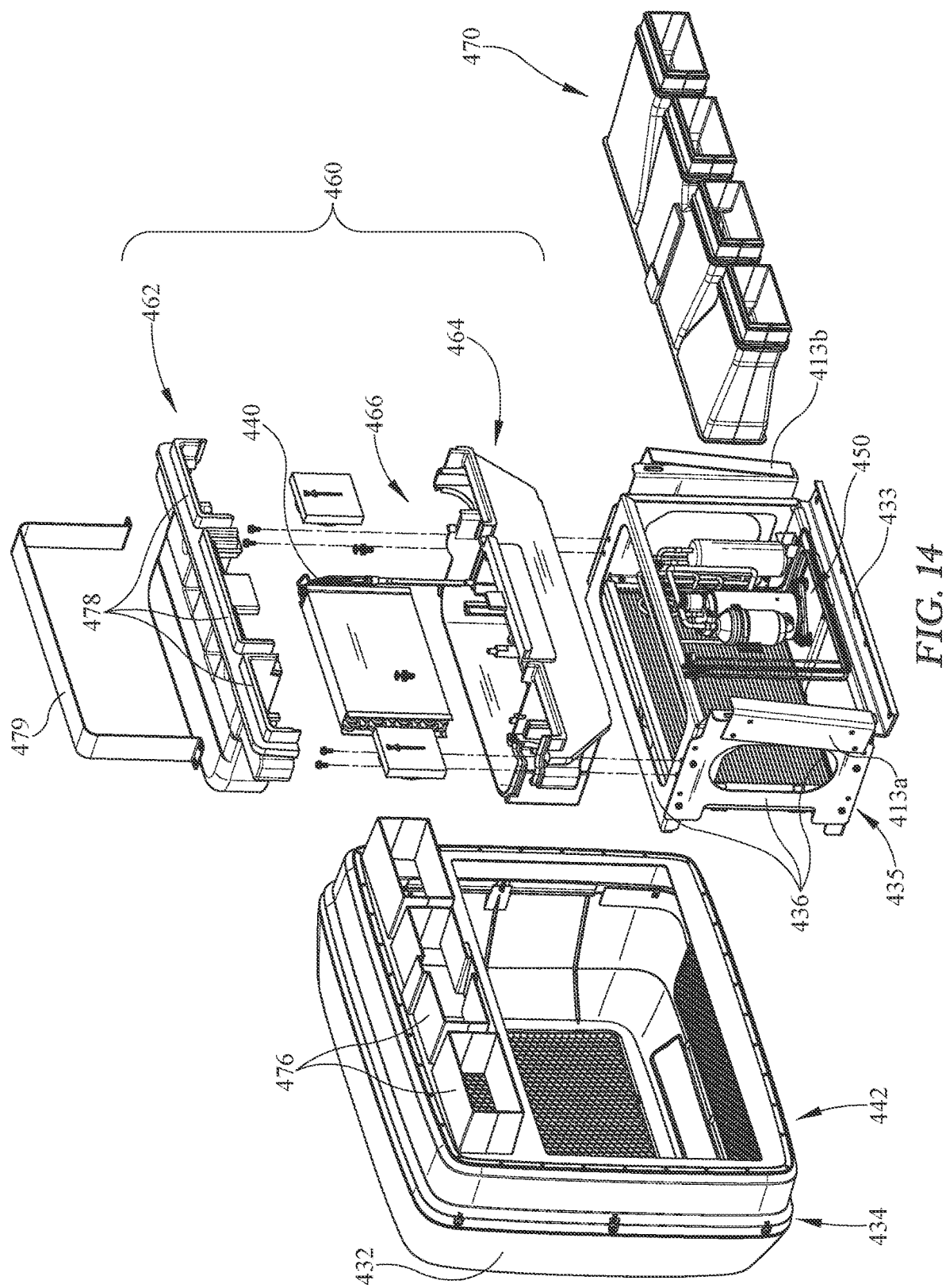
FIG. 14 is an exploded perspective view of the mobile HVAC of FIG. 12.

With reference now to FIG. 14, an exploded perspective view of the mobile air conditioner 430 is shown. In the embodiment shown, the shroud 432 and base 434 are shown on at the left side of the Figure.

The base extender 442 is shown having duct couplings 476 which extend from the base 434 or the base extender 442. The duct couplings 476 correspond in size and location to the supply and return ducts 470 previously described. The duct couplings 476 may be connected directly or indirectly to the evaporator air box 460 and ducts 470.

Spaced from the duct couplings is an evaporator air box 460 which is formed of a first portion 462 and a second portion 464, according to some embodiments. In some non-limiting embodiments, the air box 460 may be formed of foam, such as an expanded polypropylene (EPP) foam. The first and second portions 462, 464 may be formed with a male/female feature or other features to aid in alignment and joining together of the two portions 464, 464. The depicted air box 460 embodiment for example includes an upper portion 462 and a lower portion 464 which when joined along adjacent edges define a cavity or an enclosure 466. The evaporator air box 460 may include duct components 478 which are aligned with the duct couplings 476 within the shroud assembly 428. When the air box portions 462, 464 are placed together, the interior cavity 466 is defined which forms at least one plenum which is in fluid communication with the ducts 470 by way of the intervening duct couplings 476.

Within the evaporator air box 460 may be the evaporator 440. Return air enters the evaporator air box 460 through ducts 472 and passes through the evaporator 440 to condition the air. After conditioning, the conditioned air is moved through the supply ducts 474 and moved back into the RV.

The first portion 462 and the second portion 464 may have adjacent edges which provide an airtight, or nearly airtight, connection. For example, one of the first or second portions 462, 464 may have a tongue and the other of the first or second portions may have a cooperating groove. The tongue and groove may engage one another about the perimeter of the evaporator air box 460. Other joining structures may be utilized, which minimizes air leakage. The first portion 462 and the second portion 464 may be formed of various materials and in some embodiments may be formed of a molded foam.

As one skilled in the art will also understand, the evaporator air box 460 also defines the plenum wherein a return air flow enters the air box 460 and wherein the supply air flow exits. The air flows may maintain separation and guidance by one or more interior walls within the evaporator air box 460. The walls may be used to separate the supply air of the supply ducts 474 from the return air of the return ducts 472.

Also shown within the evaporator air box 460 is the evaporator 440 which conditions the return air before supplying the conditioned air back into the living areas of the vehicle or RV.

Above the evaporator air box 460 is a strap 479 that may be used to retain the upper and lower air box portions 462, 464 together. The strap 479 is generally U-shaped with feet that may be attached to a frame 435, to the vehicle or RV, or to the interior of the air shroud assembly. In the embodiment depicted, the feet may include fastener holes or other fastening structure.

Below the evaporator air box is the frame 435. The frame 435 may be defined by one or more structural members 436. For example, in the instant non-limiting embodiment, the frame 435 is defined by an upper frame member, a lower frame member, a first side frame member, and a second side member. The shape is generally three dimensional rectangular. Other shapes may be formed to fit within the shroud 432 and base 434.

The frame members 436 may have various shapes and weight saving relief apertures. The evaporator air box 460 may be supported by the frame 435 below, or the frame 435 may be sized so that the evaporator air box 460 may fit within the frame 435. In either embodiment, the duct components 478 should be in flow communication with the duct couplings 476. Further, when assembled, the duct components 478 of the evaporator air box 460 may also be in flow communication with the ducts 470. Accordingly, for ease of construction and reliability, but not a mandatory requirement, the duct components 478, the duct couplings 476, and the ducts 470 may be aligned providing a linear air flow path.

Figure 15:
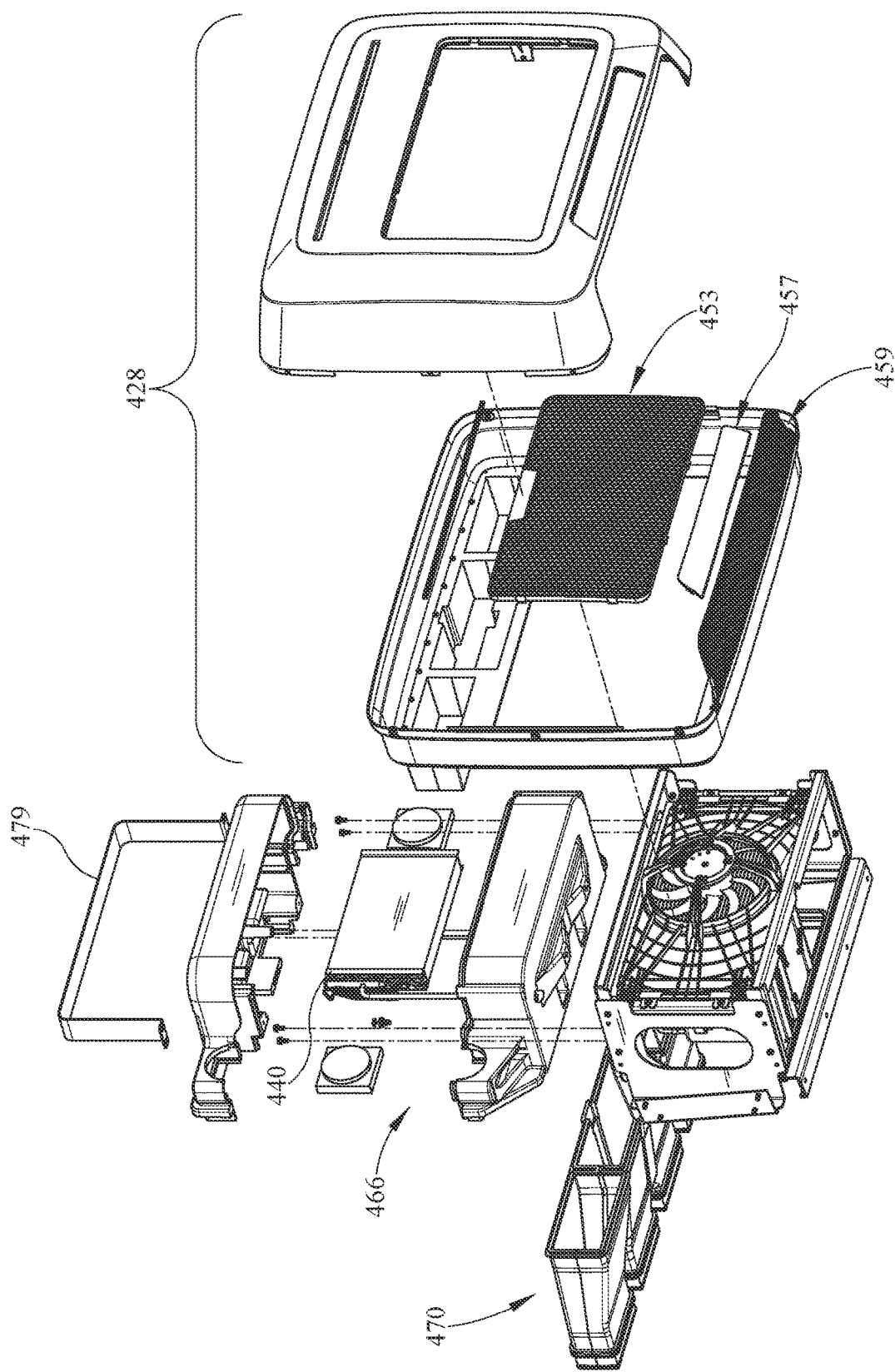
FIG. 15 is an alternative exploded perspective view of the mobile HVAC of FIG. 14.

Referring now to FIG. 15, the exploded perspective view is shown from the opposite side of FIG. 14. In this view, the grill 453 is exploded and additionally, a lower grill 459 or register is shown exploded. Between the two registers, a damper plate 457 is shown. The damper plate 457 may be actuated to introduce fresh air into the air shroud assembly 428 and into the air flow paths for fresh air in the air shroud assembly 428. Alternately, the damper plate 457 may be on the return air side of the system in order to remove hot air from the interior of the RV and cool the RV faster. In a further alternative, the plate 457 may not have fluid communication with the air flow of the conditioned air, but instead may define a transition plate wherein a backup camera and a light may be located. The light may illuminate the area behind the RV so the camera video is clearer and illuminated for the driver.

Figure 16:
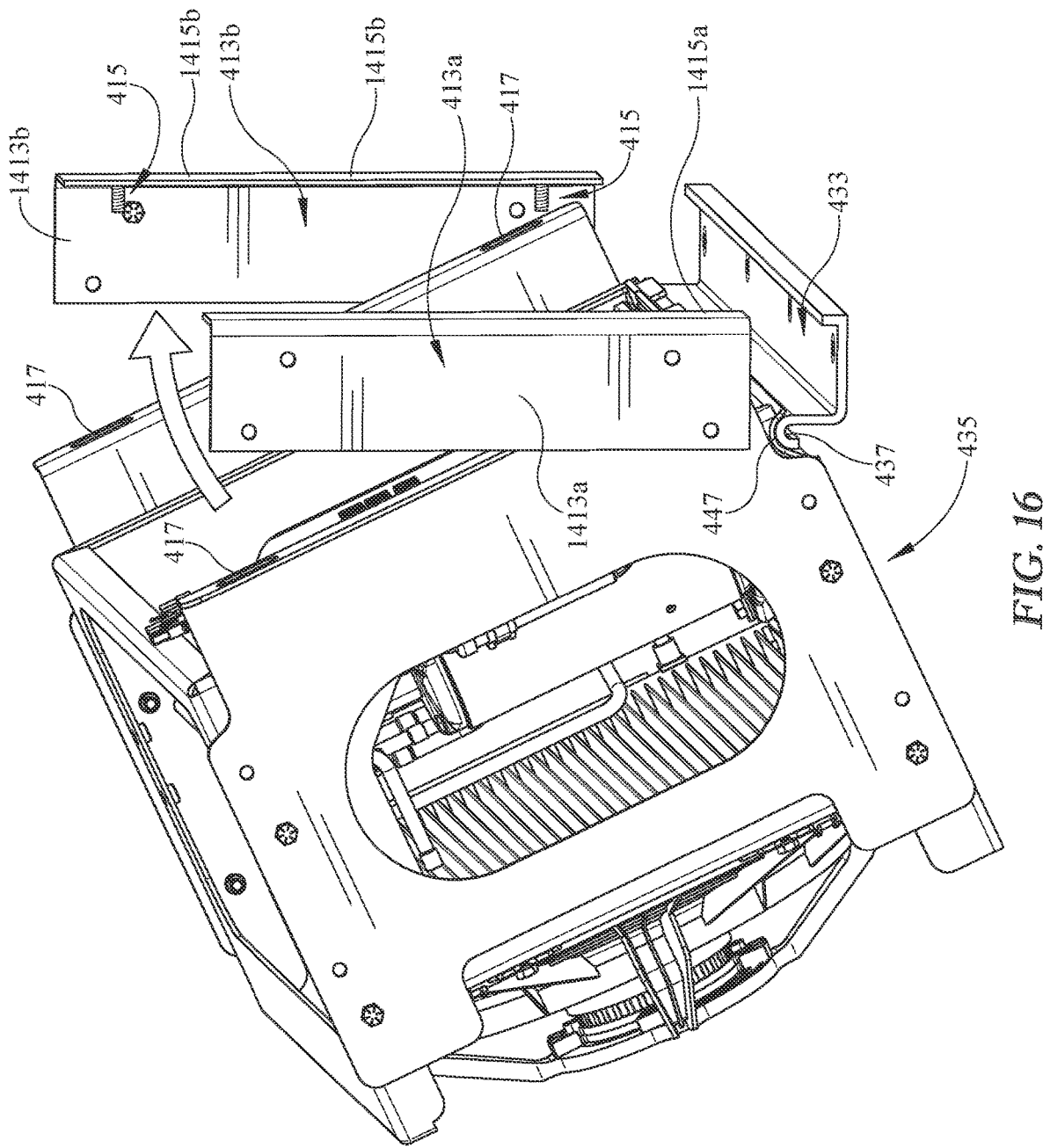
FIG. 16 is a first side sequence view of the installation of the HVAC frame; and, FIG. 17 is a second side sequence view of the installation of the HVAC frame.
Figure 17:
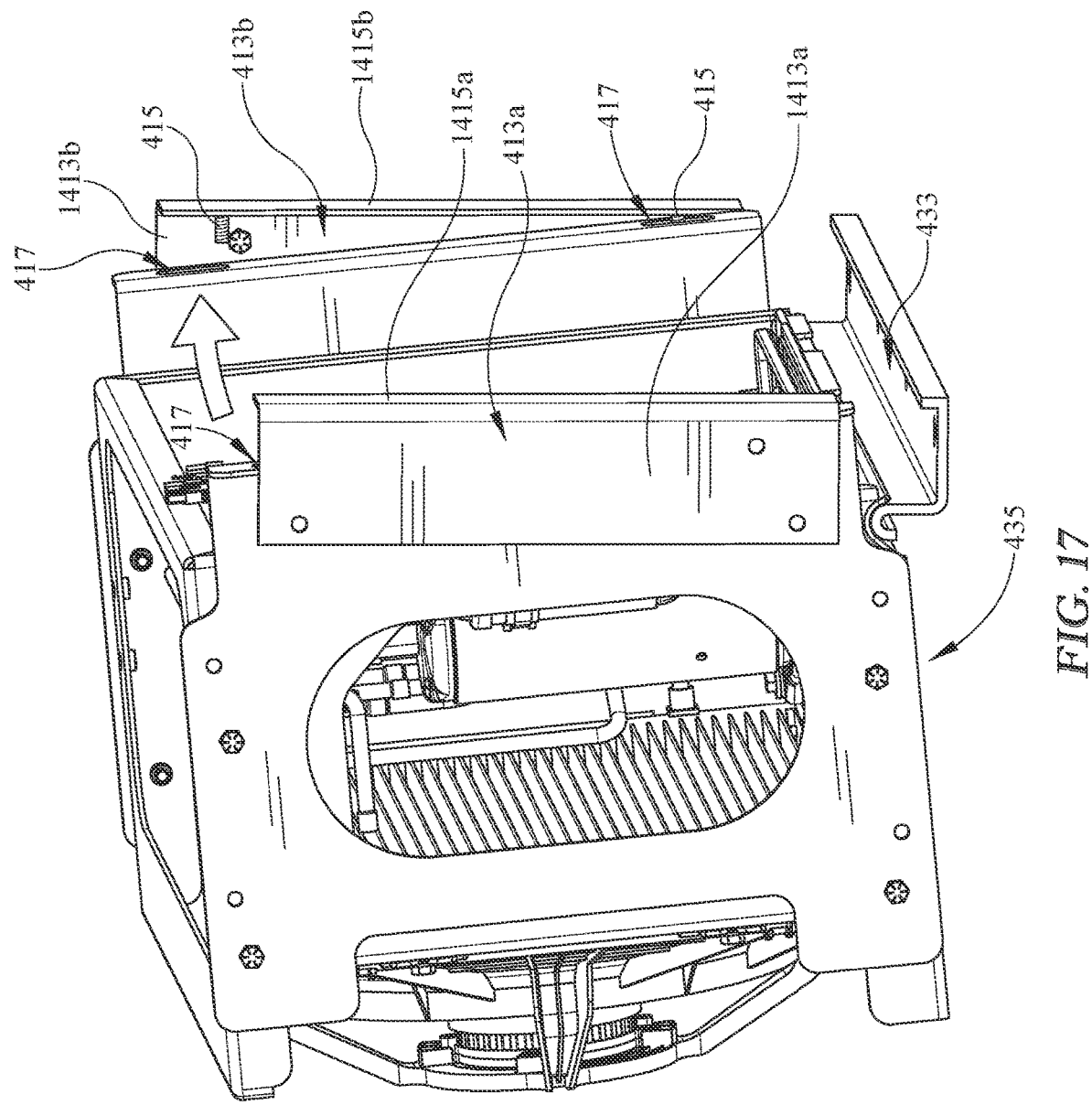

Referring now to FIGS. 16 and 17, two sequence views are depicted which show support and connection of the frame 435 from the RV. With first reference to FIG. 16, the frame mount 433 is depicted and is configured for connection to an RV structural member, for example a horizontal support member (not shown). The frame mount 433 includes a curved structure, radiused or rolled upper edge 437 upon which a corresponding frame edge 447 is disposed. The curved upper edge 437 provides a location for seating of the frame 435. The frame 435 may comprise a complementary edge 447 with similar radius to the upper edge 437 of the frame mount 433 so that the frame 435 fits on and engages frame mount 433, and further is capable of pivoting on the frame mount 433 between the position shown in FIG. 16 and the position shown in FIG. 17. Accordingly, the engagement of the frame mount 433 and frame 435 at edges 437, 447 defines a pivot axis for pivoting of the frame 435 into is mounted position.

Also shown in FIG. 16, the brackets 413a, 413b are also formed, in some non-limiting embodiments in an L-shape. The laterally outer legs 1413a, 1413b of the L-shape may be connected to vertical members of the RV support. The inward portions 1415a, 1415b of the L-shape may each include threaded fasteners 415. The threaded fasteners 415 may extend through mating portions of the frame 435 such that the threaded fasteners 415 may extend through apertures 417 of the frame 435. A nut (not shown) may be positioned on the threaded fastener 415 in order to retain the frame 435 in position against the brackets 413a, 413b. In other embodiments, a threaded fastener may extend from frame 435 and through an aperture in the brackets 413a, 413b. In some non-limiting examples, the fastener 415 may be a pin stud and may be threaded or unthreaded and fastened by a nut or other retaining structure.

Additionally, the frame mount 433 is shown. In some embodiments, the frame mount is U-shaped and the in the example, non-limiting view shown, left leg of the frame mount is taller than the right leg. The taller leg comprises the curved upper edge 437 which supports the frame 435 for pivoting.

With reference to FIG. 17, the frame 435 is rotated forward toward the brackets 413a, 413b. The frame 435 is still supported from below by the frame mount 435. Further, the threaded fasteners 415 extend toward and nearly through the frame 435 so that a nut may be applied to each threaded fastener 415. Once the frame 435 is fully rotated forward, the frame 435 and the brackets 413a, 413b will be engaged and the fasteners may be fastened. The nuts and fasteners retain the frame 435 against the brackets 413a, 413b and to the vehicle 10. Further, the frame 435 is supported from below by the mount 433.

Various installation methods may be used, but in some embodiments, the frame mount 435 and brackets 413 may be installed. Next the base 434, and base extender 442 if used, may be installed. After this, in some embodiments, the frame 435 and cooling mechanicals may be installed on the base 434. After making electrical connections, the shroud 432 may then be installed.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The foregoing description of methods and embodiments has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A wall mount mobile air conditioner, comprising:
an air conditioner frame;
a lower edge of said air conditioner frame having a curved edge;
a frame mount configured to be connected to an exterior side of an exterior wall of a vehicle, said frame mount having a corresponding curved edge which is engaged by said curved edge of said air conditioner frame;
said air conditioner frame pivotable relative to said frame mount by said curved edge of said air conditioner frame and said corresponding curved edge of said frame mount;
one or more brackets mounted to said exterior wall and spaced from said frame mount, said one or more brackets engaging said air conditioner frame when said air conditioner frame is pivoted to said one or more brackets and said exterior wall of said vehicle;
a fastener extending between said air conditioner frame and said one or more brackets when said air conditioner frame is pivoted to engage said one or more brackets, and retain said air conditioner frame engaged with said one or more brackets.

2. The wall mount mobile air conditioner of claim 1, further comprising an evaporator air box.

3. The wall mount mobile air conditioner of claim 2, said evaporator air box formed of foam.

4. The wall mount mobile air conditioner of claim 3, said foam evaporator air box having a first portion and a second portion.

5. The wall mount mobile air conditioner of claim 1, further comprising a plurality of ducts.

6. The wall mount mobile air conditioner of claim 1 further comprising a compression refrigerant system.

7. The wall mount mobile air conditioner of claim 1, said fastener being a pin stud.

8. The wall mount mobile air conditioner of claim 1, said fastener being a threaded.

9. The wall mount mobile air conditioner of claim 1, said one or more brackets having a first arm and a second arm.

10. The wall mount mobile air conditioner of claim 1 further comprising an air shroud.

11. The wall mount mobile air conditioner of claim 10, further comprising a base.

12. A wall mount mobile air conditioner, comprising:
a mobile air conditioner frame having one or more components of a compression refrigeration system therein;
a curved edge on a lower area of said mobile air conditioner frame, said curved edge forming a portion of a pivot;
a frame mount configured to be mounted on an exterior side of an exterior wall of a vehicle, said frame mount comprising a corresponding curved edge which engages said curved edge of said mobile air conditioner frame;
wherein said frame mount is fixed and said mobile air conditioner frame is pivotable between a first position and a second position relative to said frame mount by said curved edge and said corresponding curved edge; and,
one or more brackets capable of connection to and retention of said mobile air conditioner frame by a fastener when said mobile air conditioner frame is pivoted to said one or more brackets and said exterior wall of said vehicle in one of said first position or said second position.

13. The wall mount mobile air conditioner of claim 12, further comprising a foam air box.

14. The wall mount mobile air conditioner of claim 13, further comprising an evaporator located within said foam air box.

15. The wall mount mobile air conditioner of claim 14, said foam air box receiving air from said vehicle and moving air across said evaporator before directing said air to said vehicle.

16. The wall mount mobile air conditioner of claim 14, further comprising a plurality of ducts extending from said foam air box.

17. The wall mount mobile air conditioner of claim 12 further comprising a base and a shroud.

18. The wall mount mobile air conditioner of claim 17, said shroud having a grill for heat exchange of a condenser.

* * * * *